United States Patent
Bang et al.

(10) Patent No.: US 10,701,396 B2
(45) Date of Patent: Jun. 30, 2020

(54) MULTI-VIEWPOINT VIDEO ENCODING/DECODING METHOD

(71) Applicants: Electronics and Telecommunications Research Institute, Daejeon (KR); University—Industry Cooperation Group of Kyung Hee University, Yongin-si (KR)

(72) Inventors: Gun Bang, Daejeon (KR); Woo Woen Gwun, Jeonju-si (KR); Gwang Soon Lee, Daejeon (KR); Nam Ho Hur, Sejong-si (KR); Gwang Hoon Park, Seongnam-si (KR); Sung Jae Yoon, Yongin-si (KR); Young Su Heo, Suwon-si (KR); Seok Jong Hong, Pohang-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 35 days.

(21) Appl. No.: 15/775,502

(22) PCT Filed: Nov. 23, 2016

(86) PCT No.: PCT/KR2016/013571
§ 371 (c)(1),
(2) Date: May 11, 2018

(87) PCT Pub. No.: WO2017/090988
PCT Pub. Date: Jun. 1, 2017

(65) Prior Publication Data
US 2018/0359487 A1    Dec. 13, 2018

(30) Foreign Application Priority Data

Nov. 23, 2015 (KR) .................. 10-2015-0164057
Nov. 23, 2015 (KR) .................. 10-2015-0164266

(51) Int. Cl.
*H04N 19/597* (2014.01)
*H04N 13/111* (2018.01)
(Continued)

(52) U.S. Cl.
CPC ......... *H04N 19/597* (2014.11); *H04N 13/111* (2018.05); *H04N 19/103* (2014.11);
(Continued)

(58) Field of Classification Search
CPC ... H04N 19/597; H04N 13/111; H04N 19/593
(Continued)

(56) References Cited

U.S. PATENT DOCUMENTS

| 2013/0108183 A1* | 5/2013 | Bruls | ...................... G06T 9/004 |
| | | | 382/233 |
| 2013/0114699 A1* | 5/2013 | Kim | ...................... H04N 19/597 |
| | | | 375/240.03 |

(Continued)

FOREIGN PATENT DOCUMENTS

| JP | 2012-124564 A | 6/2012 |
| KR | 10-2007-0011147 A | 1/2007 |

(Continued)

OTHER PUBLICATIONS

Shimizu, Shinya et al., "Use Cases and Requirements on Free-viewpoint Television (FTV) v.2", *International Organisation for Standardisation Organisation Internationale de Normalisation Iso/Iec Jtc1/Sc29/Wg11 Coding of Moving Pictures and Audio*, Geneve, Switzerland, Oct. 2015, (pp. 1-5).

(Continued)

*Primary Examiner* — Hee-Yong Kim
(74) *Attorney, Agent, or Firm* — NSIP Law

(57) ABSTRACT

The present invention relates to a video encoding/decoding method and apparatus, and more particularly, to a method and apparatus for generating a reference image for a multiview video. The video encoding method includes, in the presence of a second image having a different view from a first image having a first view, transforming the second image to have the first view, generating a reference image by adding the second image to a side of the first image, and storing the reference image in a reference picture list.

17 Claims, 27 Drawing Sheets

(51) Int. Cl.
| | |
|---|---|
| H04N 19/593 | (2014.01) |
| H04N 19/119 | (2014.01) |
| H04N 19/176 | (2014.01) |
| H04N 19/91 | (2014.01) |
| H04N 19/103 | (2014.01) |
| H04N 19/503 | (2014.01) |
| H04N 19/40 | (2014.01) |
| H04N 19/50 | (2014.01) |

(52) U.S. Cl.
CPC ......... *H04N 19/119* (2014.11); *H04N 19/176* (2014.11); *H04N 19/40* (2014.11); *H04N 19/50* (2014.11); *H04N 19/503* (2014.11); *H04N 19/593* (2014.11); *H04N 19/91* (2014.11)

(58) Field of Classification Search
USPC .................................................. 375/240.12
See application file for complete search history.

(56) References Cited

U.S. PATENT DOCUMENTS

| | | |
|---|---|---|
| 2015/0146779 A1 | 5/2015 | Bang et al. |
| 2015/0264398 A1 | 9/2015 | Bang et al. |
| 2015/0281734 A1 | 10/2015 | Koo et al. |

FOREIGN PATENT DOCUMENTS

| | | |
|---|---|---|
| KR | 10-2007-0042288 A | 4/2007 |
| KR | 10-2007-0074495 A | 7/2007 |
| KR | 10-2012-0140515 A | 12/2012 |
| KR | 10-2015-0090053 A | 8/2015 |
| WO | WO 2012/099352 A2 | 7/2012 |

OTHER PUBLICATIONS

International Search Report dated Feb. 27, 2017 in corresponding International Patent Application No. PCT/KR2016/013571 (2 pages in English and 2 pages in Korean).

Sun, Xinding, et al. "Panoramic Video Capturing and Compressed Domain Virtual Camera Control", *Proceedings of the ninth ACM international conference on Multimedia. ACM*, 2001 (pp. 329-338).

Jiang, Kehua et al., "Compression of Cubic-Panorama Datasets with Spatially Consistent Representation", *2006 IEEE International Workshop on Haptic Audio Visual Environments and their Applications (HAVE 2006)*, 2006 (pp. 111-116).

Kangni, Florian et al., "Epipolar Geometry for the Rectification of Cubic Panoramas", *The 3rd Canadian Conference on Computer and Robot Vision (CRV'06)*, 2006 (8 pages in English).

Chen, Ke et al., "Expanding Line Search for Panorama Motion Estimation", *2009 11th IEEE International Symposium on Multimedia*, 2009 (pp. 577-582).

\* cited by examiner (a)　　　　　　　　(b)　　　　　　　　(c)

(a)　　　　　　　　　　　　　　(b)

(a)  (b)

(a)  (b)

(a)                   (b)                   (c)

(a) Reference Frame   (b) Current Frame (a)                                    (b)

(a)  (b)

(a)      (b)      (c)

Copy Pixel Values to the Right
(a)

Copy Pixel Values Upward
(b)

MULTI-VIEWPOINT VIDEO ENCODING/DECODING METHOD

CROSS REFERENCE TO RELATED APPLICATIONS

This application is a U.S. National Stage Application of International Application No. PCT/KR2016/013571, filed on Nov. 23, 2016 which claims the benefit under 35 USC 119(a) and 365(b) of Korean Patent Application No. 10-2015-0164057, filed on Nov. 23, 2015, and Korean Patent Application No. 10-2015-0164266, filed on Nov. 23, 2015 in the Korean Intellectual Property Office.

TECHNICAL FIELD

The present disclosure relates generally to a video encoding/decoding method, and more particularly, to a method for predicting a multiview video.

BACKGROUND ART

Along with technology development, High Definition (HD)/high-quality broadcasting service has become popular. Thus, Ultra High Definition (UHD) offering a resolution higher than HD by four times has attracted more and more interest.

In this context, more attention has been attracted to realistic images such as stereoscopic images or omnidirectional video, in addition to traditional Two-Dimensional (2D) images. Although devices capable of playing realistic images, such as a Head-Mounted Display (HMD) have been commercialized owing to the development of new media, realistic media are still encoded/decoded in the same manner as 2D images. Accordingly, there exists a need for developing a compression scheme adapted to the characteristics of the realistic media in order to increase the compression efficiency of the realistic media.

DISCLOSURE

Technical Problem

An object of the present disclosure is to provide a method for increasing the encoding/decoding efficiency of a multi-view video.

Another object of the present disclosure is to provide a method and apparatus for unifying different views of images into one view, and performing encoding/decoding using a reference image obtained by combining the images having the unified view.

Another object of the present disclosure is to provide a method for, when a current block and a neighbor block have different views, increasing the prediction efficiency of the current block by transforming prediction information of the neighbor block.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present invention, a video encoding method includes, in the presence of a second image having a different view from a first image having a first view, transforming the second image to have the first view, generating a reference image by adding the second image to a side of the first image, and storing the reference image in a reference picture list.

In another aspect of the present invention, a video decoding method includes, in the presence of a second image having a different view from a first image having a first view, transforming the second image to have the first view, generating a reference image by adding the second image to a side of the first image, and storing the reference image in a reference picture list.

The followings may be commonly applied to the video encoding method and the video decoding method.

The transformed image may be generated based on a view difference between the first image and the second image, and the view difference may include at least one of a distance difference and an angle difference between the first image and the second image.

The view difference may be determined based on characteristics of an omni-directional image including the first image and the second image.

If the omni-directional image is projected into a regular polyhedron, the angle difference between the first image and the second image may be determined to be an internal angle of the regular polyhedron.

The view difference may be calculated based on a distance and an angle difference between a first camera used to capture the first image and a second camera used to capture the second image.

A position at which the second image is added may be determined according to characteristics of a regular polyhedron including the first image and the second image.

The reference image may be stored in the reference picture list along with time information corresponding to the first image and the second image.

The above briefly summarized features of the present disclosure are merely exemplary aspects of the detailed description of the present disclosure, not limiting the scope of the present disclosure.

The above briefly summarized features of the present disclosure are merely exemplary aspects of the detailed description of the present disclosure, not limiting the scope of the present disclosure.

Advantageous Effects

According to the present disclosure, a method for increasing the encoding/decoding efficiency of a multiview video can be provided.

Specifically, according to the present disclosure, a method and apparatus for unifying different views of images into one view and performing encoding/decoding using a reference image obtained by combining the images with the unified view can be provided.

Specifically, according to the present disclosure, a method for, when a current block and a neighbor block have different views, increasing the prediction efficiency of the current block by transforming prediction information of the neighbor block can be provided.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

BEST MODE

Figure 1:
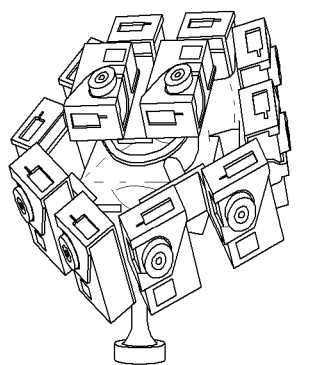
FIG. 1 is a view illustrating exemplary camera types for generating a Three-Dimensional (3D) multiview image.
Figure 1:
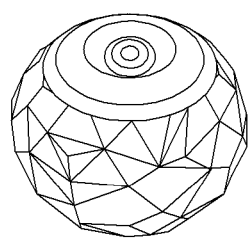
Figure 1:
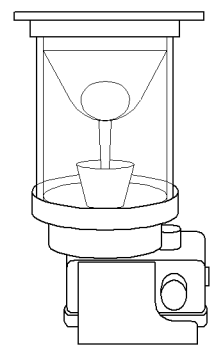

Various modifications may be made to the present invention, and the present invention may be implemented in various embodiments. Particular embodiments of the present invention are described with reference to the accompanying drawings. However, the scope of the present invention is not intended to be limited to the particular embodiments and it is to be understood that the present invention covers all modifications, equivalents, and/or alternatives falling within the scope and spirit of the present invention. In relation to a description of the drawings, like reference numerals denote the same components. For clarity of description, the shapes and sizes of components may be shown as exaggerated in the drawings. The following detailed description of exemplary embodiments is given with reference to the attached drawings illustrating a specific embodiment as an example. These embodiments are described in great detail enough to allow those skilled in the art to practice the embodiments. It is to be understood that although various embodiments are different, they do not need to be exclusive from one another. For example, a specific shape, structure, and feature in an embodiment may be realized as another embodiment without departing from the scope and spirit of the present invention. Further, it is to be understood that the positions or arrangement of individual components in each disclosed embodiment can be changed within the scope and spirit of the embodiment. Accordingly, the following description is to be regarded as illustrative in nature and not restrictive, and the scope of the exemplary embodiments, if described appropriately, are limited by the appended claims together with all equivalents to what the claims claim.

The term as used in the present invention, first or second may be used to describe various components, not limiting the components. These expressions are used to distinguish one component from another component. For example, a first component may be referred to as a second component and vice versa without departing the scope of the present invention. The term, and/or includes a combination of a plurality of related items or any of the plurality of related items.

When it is said that a component is "coupled with/to" or "connected to" another component, it should be understood that the one component is coupled or connected to the other component directly or through any other component in between. On the other hand, when it is said that a component is "directly coupled with/to" or "directly connected to" another component, it should be understood that the one component is coupled or connected to the other component directly without any other component in between.

While components are shown as independent to represent different characteristic functions in embodiments of the present invention, this does not imply that the components are configured as separate hardware or software units. In other words, although each component is described and illustrated as independent for the convenience of description, two or more components may be incorporated into a single component, or one component may be separated into a plurality of components, for function execution. An embodiment with components incorporated into one component and an embodiment with a component separated into a plurality of components fall within the scope of the present invention, as far as they do not depart from the spirit of the present invention.

The terms as used in the present disclosure are provided to describe merely specific embodiments, not intended to limit the scope of other embodiments. It is to be understood that singular forms include plural referents unless the context clearly dictates otherwise. In the present disclosure, the term "include" or "have/has" signifies the presence of a feature, a number, a step, an operation, a component, a part, or a combination of two or more of them as described in the present disclosure, not excluding the presence of one or more other features, numbers, steps, operations, components, parts, or a combination of two or more of them. That is, in the present invention, the term "have", "may have", "include", or "may include" signifies the presence of a specific component, not excluding the presence Some components may not be mandatory in executing a key function in the present invention, but be optional just to improve performance. The present invention may be implemented only with components essential to realization of the subject matter of the present invention, excluding components used to improve performance. This structure also falls within the scope of the present invention.

The term as used in the present invention, view is related to the direction and perspective of a camera, thus covering viewpoint and perspective. For the convenience of description, a Three-Dimensional (3D) multiview image will be described in the context of perspective in the following embodiments.

Embodiments of the present invention are described in detail with reference to the accompanying drawings. Lest it should obscure the subject matter of the present invention, a detailed description of a known configuration or function will be omitted. Like reference numerals denote the same components in the drawings, and a redundant description of the same components is avoided.

Compared to a traditional Two-Dimensional (2D) video which is reproduced with a fixed view, an omni-directional video (or a 360-degree video) may be reproduced from a user-desired view. Various types of cameras illustrated in FIG. 1 are available for generation of an omni-directional video. A 3D space (e.g., a 360-degree direction) may be captured at one point using a plurality of cameras illustrated in (a) of FIG. 1, a fish-eye lens illustrated in (b) of FIG. 1, or a mirror illustrated in (c) of FIG. 1, and the captured 3D image may be projected into a 3D figure such as a polyhedron or a sphere.

Besides omni-directional video, realistic video includes divergent video produced by capturing images in various directions using a plurality of cameras, and convergent video. The divergent video is generated by capturing images in various directions using a plurality of cameras, whereas the convergent video is generated by capturing an image in a specific direction using a plurality of cameras.

Figure 2:
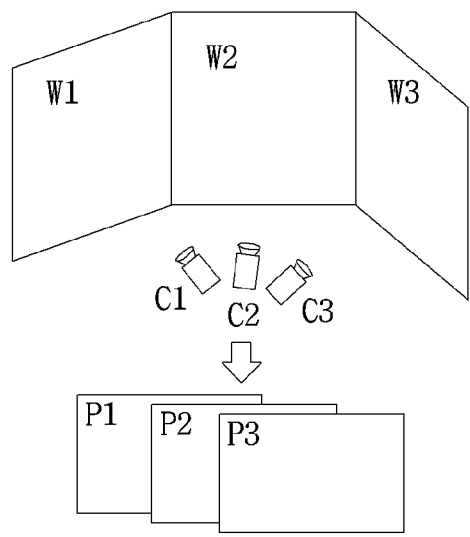
FIG. 2 is a view depicting a divergent video.
Figure 2:
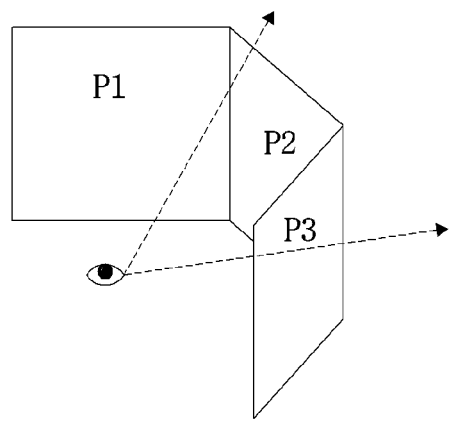
Figure 3:
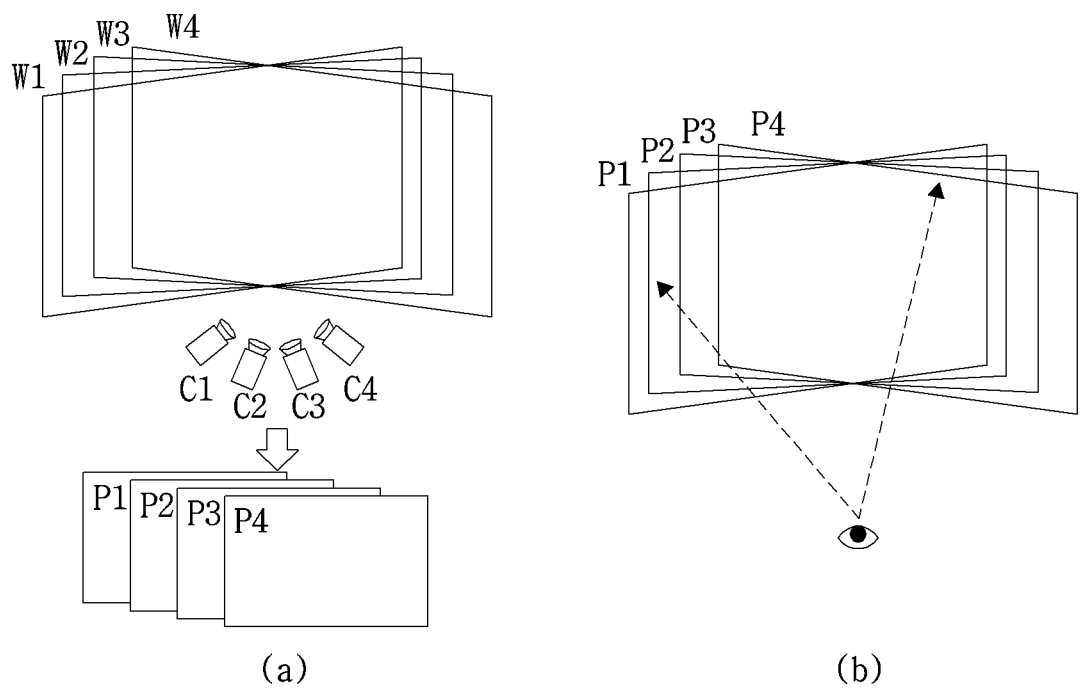
FIG. 3 is a view depicting a convergent video.

FIGS. 2 and 3 are views depicting a divergent video and a convergent video. A divergent image refers to images captured in divergent directions through a plurality of cameras. For example, in (a) of FIG. 2, directions W1, W2, and W3 of cameras C1, C2, and C3 are divergent.

A convergent image refers to images captured, with directions of a plurality of cameras converging to one point. For example, in (c) of FIG. 3, directions W1, W2, W3, and W4 of cameras C1, C2, C3, and C4 converge to one point.

An omni-directional 3D video, or a 3D multiview video captured with cameras arranged convergently or divergently may be unfolded into a planar form of a polyhedron or an equirectangular form into which a sphere is unfolded.

Figure 4:
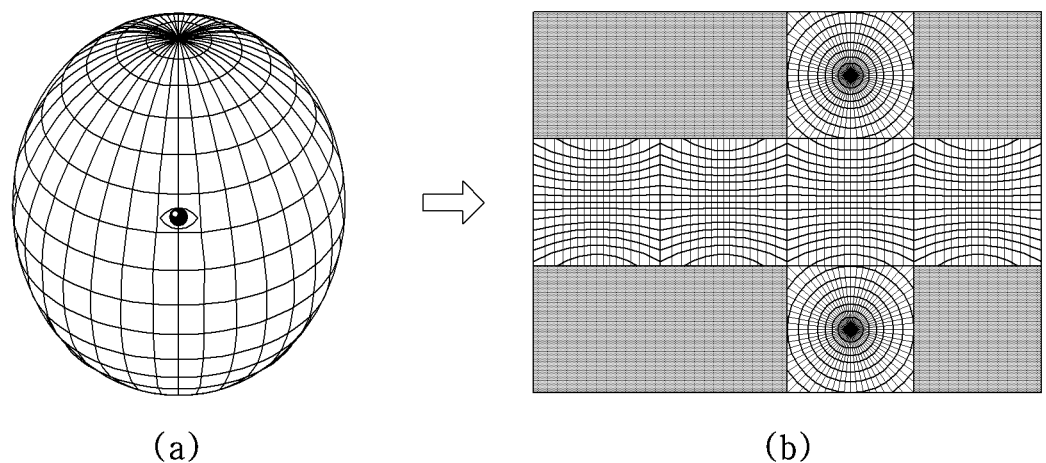
FIG. 4 is a view illustrating an example of projecting a 3D multiview video into a planar figure representing a polyhedron cut open and laid flat.

For example, (a) and (b) of FIG. 4 illustrate an exemplary planar form of a regular hexahedron into which a spherical 3D multiview image is unfolded. Referring to (a) and (b) of FIG. 4, a 2D image in the planar form of a regular hexahedron may be obtained from an omni-directional 3D image.

Figure 5:
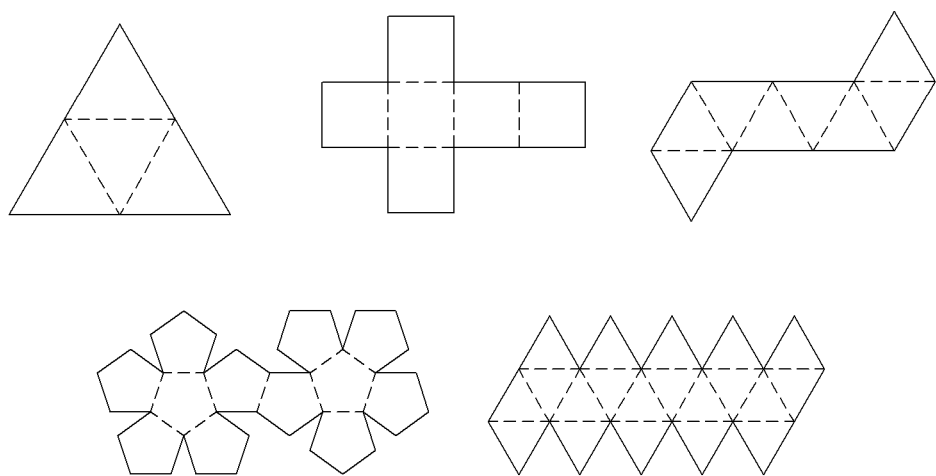
FIG. 5 is a view depicting exemplary Two-Dimensional (2D) planar forms into which a 3D multiview video is unfolded.

In addition to the example of FIG. 4, a 3D multiview image may be unfolded into planar forms of various types of polyhedrons. For example, FIG. 5 is a view depicting exemplary 2D planar forms of 3D multiview images. As illustrated in FIG. 5, 3D multiview images may be projected into planar forms of various 3D figures, such as a regular tetrahedron, a regular hexahedron, a regular octahedron, a regular dodecahedron, or a regular icosahedron.

Figure 6:
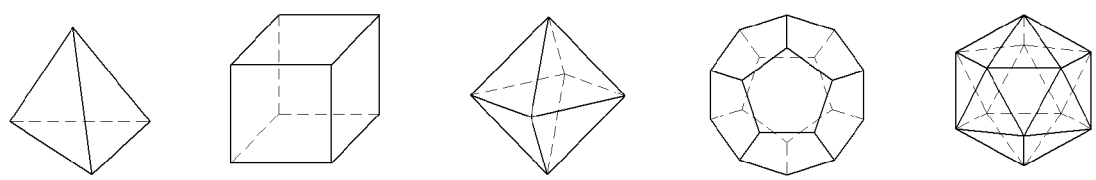
FIG. 6 is a view depicting exemplary 3D forms of a 3D multiview video.

When a video is reproduced, a 2D planar image may be reconstructed to a polyhedron, a sphere, or the like in a 3D space. For example, a 3D video may be reconstructed into a regular tetrahedron, a regular hexahedron, a regular octahedron, a regular dodecahedron, or a regular icosahedron, as illustrated in FIG. 6.

On the assumption that a user's gaze is directed to the center of a polyhedron, the user cannot view all areas of a 3D image reconstructed into the polyhedron. Therefore, when a 3D multiview video is reproduced, only a specific point viewed at a specific time by the user or only an area corresponding to a user-selected specific point among the total 3D areas is displayed.

Figure 7:
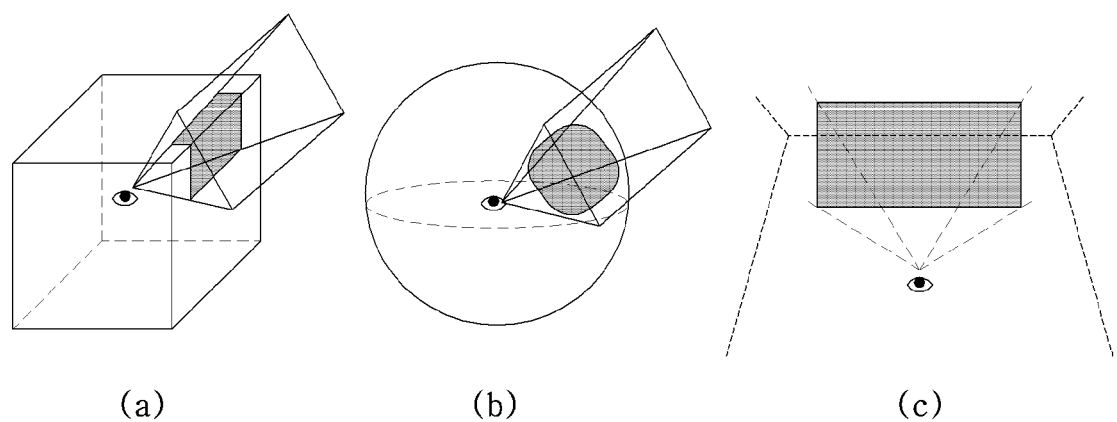
FIG. 7 is a view depicting examples of displaying a part of a 3D multiview video.

FIG. 7 is a view depicting exemplary partial display of 3D multiview images. (a) and (b) of FIG. 7 are views depicting virtual representations of users viewing 3D multiview images, seen from the outside, and (c) of FIG. 7 is a conceptual view depicting an omni-directional image with respect to a user viewing a 3D multiview image.

When a 3D multiview video is reproduced, a part to which the eyes of a user are directed or a user-selected part in the total areas of a reconstructed 3D image may be reproduced. For example, shaded areas in (a) and (b) of FIG. 7 are a part to which the eyes of a user are directed or a user-selected part in a reconstructed 3D image. In this case, an area corresponding to the part to which the eyes of a user are directed or the user-selected part may be output. For example, from the viewpoint of a user, only a part of a total area may be displayed, as illustrated in (c) of FIG. 7.

A 3D multiview image may have a plurality of views. The plurality of views mean that the multiview image has a plurality of viewpoints or a plurality of perspectives, which will be described below in greater detail.

Figure 8:
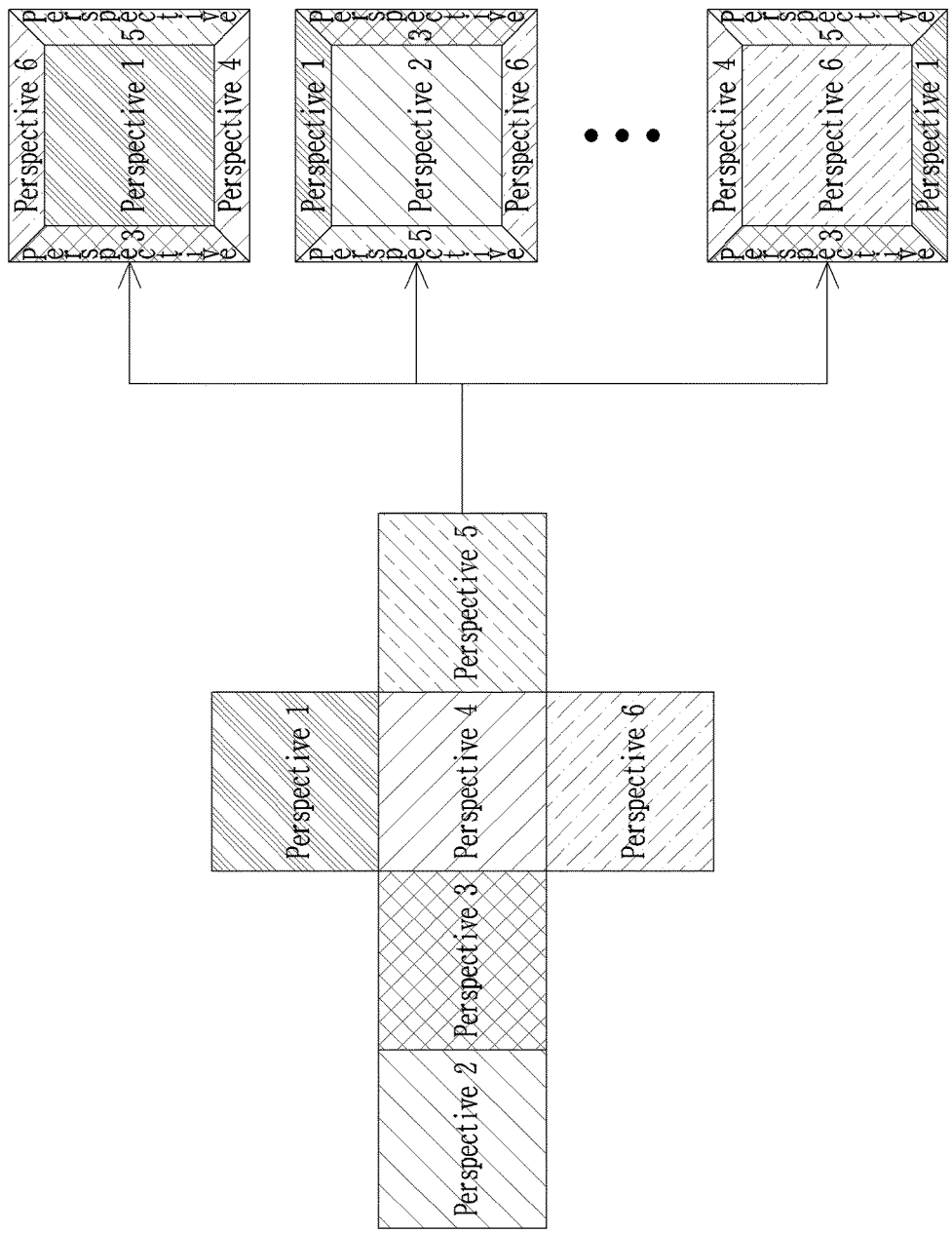
FIG. 8 is view depicting examples of reproducing a 3D video unfolded into a regular hexahedron.

FIG. 8 is view depicting examples of reproducing a 3D video unfolded into a regular hexahedron. The eyes of a user viewing the 3D video is directed to the center of the regular hexahedron, and each surface of the regular hexahedron is a perspective viewed by the eyes of the user. For example, in the example of FIG. 8, if the front surface of the regular hexahedron is perspective 4 and the perspective above perspective 4 is perspective 1, perspective 2 may correspond to the rear surface of the regular hexahedron, perspective 3 may correspond to the left surface of the regular hexahedron, perspective 5 may correspond to the right surface of the regular hexahedron, and perspective 6 may correspond to the bottom surface of the regular hexahedron. Accordingly, each surface of the regular hexahedron in the 3D video may have a different view, as illustrated in FIG. 8.

In the case of a divergent video, since each camera takes a different capturing direction, a perspective difference may occur between images. For example, in the example of (b) of FIG. 2, the three cameras C1, C2, and C3 are directed in different directions, thus producing the three images P1, P2, and P3 having different views.

In the case of a convergent image, an image captured by each camera may also have a different perspective. For example, in the example of (a) of FIG. 3, the four cameras C1, C2, C3, and C4 are directed in different directions, thus producing the four images P1, P2, P3, and P4 having different views.

For the convenience of description, the following embodiments are described on the assumption that 'image' refers to an arbitrary frame or a partial area having an arbitrary view in a multiview video. For example, if an arbitrary frame of a 3D multiview video is unfolded into a regular hexahedron as illustrated in FIG. 8, the frame may be referred to as an 'image', or a partial area (i.e., a surface of the regular hexahedron) having an arbitrary view in the frame may be referred to as an 'image'.

As described before, a 3D multiview video may be projected onto a 2D space and then encoded/decoded. Therefore, the 3D multiview video may be encoded/decoded in the same manner as a 2D video. For example, an encoding/decoding method based on block segmentation, intra-prediction (or spatial prediction), and inter-prediction (or temporal prediction) used for 2D video encoding/decoding may still be used for 3D multiview video encoding/decoding. Now, a brief description will be given of an encoding/decoding scheme for use in 3D multiview video encoding/decoding.

Figure 9:
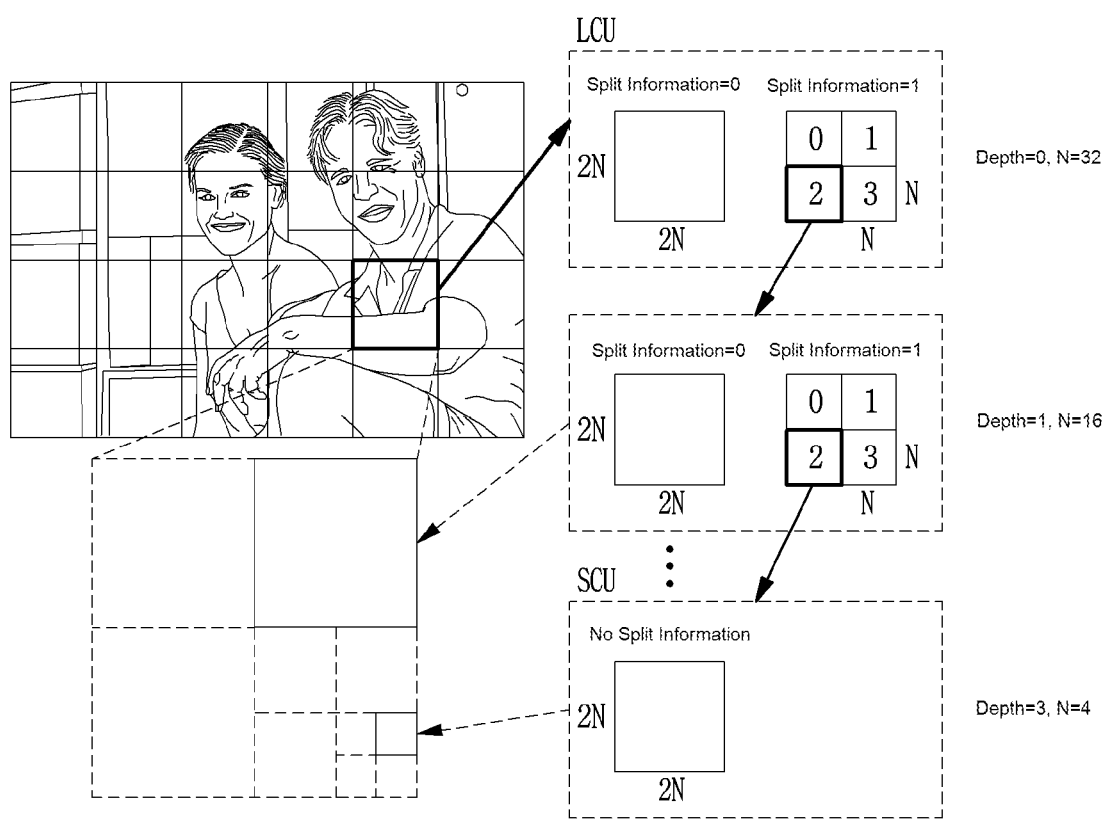
FIG. 9 is a view depicting exemplary segmentation of a Coding Tree Unit (CTU) into Coding Units (CUs) during video encoding.

In High Efficiency Video Coding (HEVC), an image is encoded/decoded on a Coding Unit (CU) basis, for efficient video coding. FIG. 9 is a view depicting exemplary segmentation of a Coding Tree Unit (CTU) into CUs. A CTU is also called a Largest Coding Unit (LCU) or equivalent to an LCU in concept.

As illustrated in FIG. 9, after an image is sequentially divided into CTUs, a segmentation structure is determined for each individual CTU. The segmentation structure refers to a distribution of CUs, for efficient encoding/decoding of an image in the CTU. The CU distribution may be determined depending on whether the CTU is split into a plurality of CUs each having a width and/or a length smaller than the width and/or the length of the CTU. For example, the CU distribution may be segmentation of the CTU into four or two CUs.

A CU may be recursively split in the same manner into a plurality of CUs each having a width and/or a length smaller than the width and/or the length of the CU. Herein, a CU may be split to a predetermined depth, and depth information may represent the size of a CU and stored for every CU. For example, a CTU being a basic segmentation target has a depth of 0, and a Smallest Coding Unit (SCU) is a CU having a maximum depth. That is, a CU with a predetermined depth may be referred to as an SCU. Each time a CTU is split into four or two CUs, the depth may be incremented by 1.

On the assumption that a CU is split into four CUs, if a CU of size 2N×2N is not split, the CU may be maintained in size 2N×2N. On the other hand, if the 2N×2N CU is split, four CUs each of size N×N may result. In this manner, each time the segmentation depth of a CU is incremented by 1, the size of N is reduced to a half.

For example, if a CTU with a minimum depth of 0 has 64×64 pixels, a 64×64-pixel CU may be represented by depth '0', a CU with 32×32 pixels may be represented by depth '1', a CU with 16×16 pixels may be represented by depth '2', and a CU with 8×8 pixels may be represented by depth '3'. If the maximum depth is 3, the size of an SCU may be 8×8 pixels.

Per-CU split information may indicate whether a specific CU is to be split. The split information may be encoded/signaled for every CU except for the SCU.

The split information may include at least one flag. The flag indicates whether a CU is split into four or two CUs. For example, if the flag is set to '0', this means that a CU is not further split, and if the flag is set to '1', this means that a CU is split into a plurality of CUs.

A CU is an encoding/decoding unit, and an encoding mode may be set on a CU basis. For example, each CU may have an intra mode (MODE_INTRA or INTRA), or an inter mode (MODE_INTER or INTER). The inter mode may include the MODE_INTER mode and a MODE_SKIP (SKIP) mode.

Figure 10:
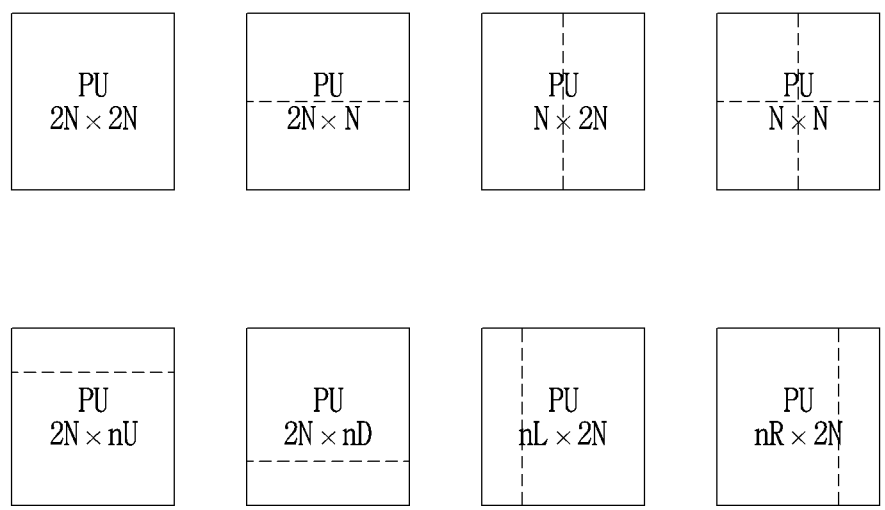
FIG. 10 is a view illustrating exemplary segmentations of a CU into Prediction Units (PUs).

A Prediction Unit (PU) is a unit for which prediction is performed. One CU may be divided into at least one PU. For example, FIG. 10 is a view depicting examples of dividing a CU into PUs. If the encoding mode of a CU is the intra mode, all PUs included in the CU may be encoded in the intra mode. If the encoding mode of a CU is the intra mode, its PU segmentation structure may be set to 2N×2N or N×N among the examples illustrated in FIG. 10.

If the encoding mode of a CU is the inter mode, all PUs included in the CU may be encoded in the inter mode. If the encoding mode of a CU is the inter mode, its PU segmentation structure may be set to one of 2N×2N, 2N×N, N×2N, N×N, 2N×nU, 2N×nD, nL×2N, and nR×2N illustrated in FIG. 10.

Inter-prediction (or temporal prediction) is a scheme of predicting a current image from a reference image based on the property that images with a small time difference are highly correlated.

Figure 11:
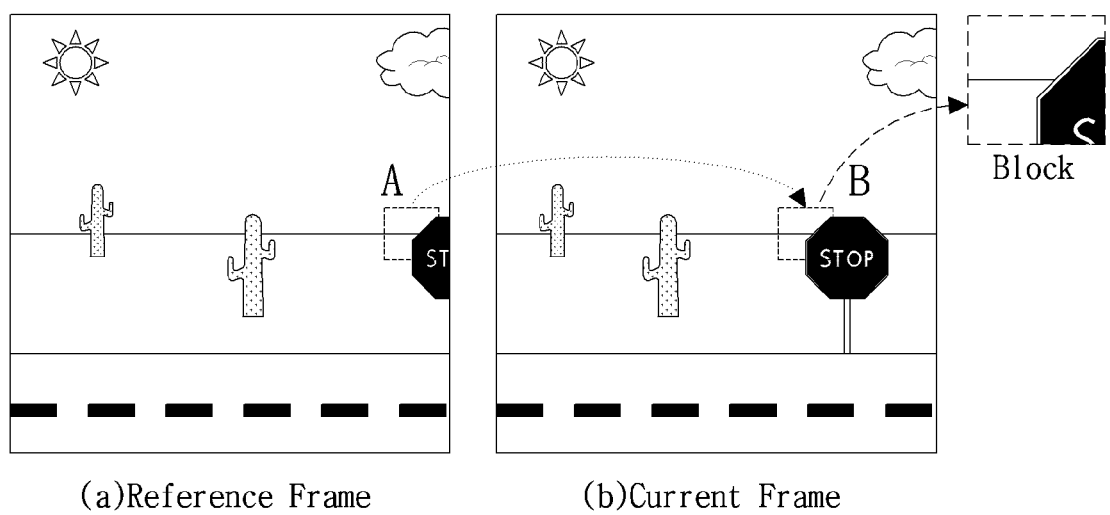
FIG. 11 is a view depicting an inter-prediction method.

FIG. 11 is a view depicting an inter-prediction method.

(a) of FIG. 11 illustrates a reference frame used for predicting a current frame, and (b) of FIG. 11 illustrates the current frame including blocks to be encoded/decoded. If block 'A' included in the reference frame is available in predicting block 'B' to be encoded/decoded, included in the current frame, it is not necessary to encode all of image information of block B in the current frame. Accordingly, use of temporal prediction may greatly reduce the amount of information to be encoded per image block, thereby increasing the efficiency of video compression.

If a PU is encoded by inter-prediction (i.e., in the inter mode), a merge mode may be used for encoding/decoding of motion information. The motion information may include at least one of a motion vector, an index of a reference image, and a prediction direction (e.g., uni-direction or bi-direction). The prediction direction may be set to uni-directional prediction or plural directional prediction (e.g., bi-directional or triple-directional prediction) depending on whether a reference picture list, RefPicList is used or not.

For example, if there are two reference picture lists, List 0 and List 1, uni-directional prediction may be classified into forward prediction (Pred_L0 or Prediction L0) using a forward reference picture list, L0 and reverse prediction (Pred_L1 or Prediction L1) using a reverse reference picture list, L1. Bi-directional prediction (Pred_BI or Prediction BI) may use both the forward reference picture list, List 0 and the reverse reference picture list, List 1. Therefore, bi-directional prediction may imply a case in which both forward prediction and reverse prediction exist.

In another example, bi-directional prediction may include two forward predictions performed by copying the forward reference picture list, L0 to the reverse reference picture list, L1 or copying the reverse reference picture list, L1 to the forward reference picture list, L0.

Such a prediction direction may be indicated by flag information (e.g., predFlagL0 and predFlagL1) indicating a prediction direction. predFlagL0 may indicate whether forward prediction based on the forward reference picture list, L0 is performed, and predFlagL1 may indicate whether reverse prediction based on the reverse reference picture list, L1 is performed. For example, for forward prediction as uni-directional prediction, predFlagL0 may be set to '1', and predFlagL1 may be set to '0'. For reverse prediction as uni-directional prediction, predFlagL0 may be set to '0', and predFlagL1 may be set to '1'. For bi-directional prediction, predFlagL0 may be set to '1', and predFlagL1 may be set to '1'.

In the merge mode, CU-wise or PU-wise merge may be performed. When merge takes place on a predetermined block unit basis, for example, on a CU basis or a PU basis, information indicating whether merge is performed on a block partition basis and information indicating a neighbor block to be merged may be encoded/signaled. The neighbor block may be spatially or temporally neighboring to a current block (e.g., a CU or PU to be encoded/decoded).

A block spatially neighboring to a current block may be a block adjacent to a boundary of the current block in the same picture. The spatial neighbor block of the current block may be a left block, an upper block, a right upper block, a left upper block, or a right lower block.

A block temporarily neighboring to the current block may be a block (collocated block) at the same position as the current block, in a picture having a different time order from that of the current block.

A merge candidate list is a list storing motion information. The merge candidate list may be generated based on motion information of neighbor blocks adjacent to the current block, before merge is performed. Further, the merge candidate list may include new motion information generated by combining motion information listed in the merge candidate list.

Figure 12:
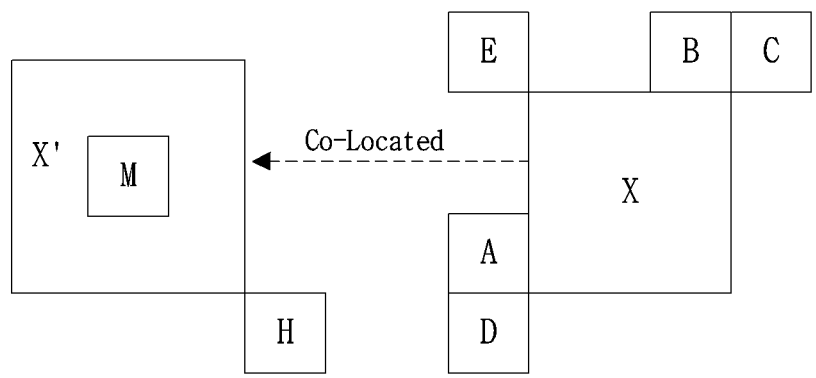
FIG. 12 is a view depicting exemplary generation of a merge candidate list.

FIG. 12 is a view depicting exemplary generation of a merge candidate list. The merge candidate list may be generated based on at least one of neighbor blocks (e.g., A, B, C, D, and E in FIG. 12) adjacent to a current block, and collocated blocks (e.g., M and H in FIG. 12) of the current block, in a different picture from that of the current block.

For a neighbor block of the current block, for example, it is determined whether use information about the neighbor block may be used in merge of the current block. If the neighbor block may be used, motion information of the neighbor block may be included in the merge candidate list. A merge candidate list for the current block (X in FIG. 8) may be included in the merge candidate list in a predetermined order. While the order is shown as A→B→C→D→E→H (or M) by way of example, the order should not be construed as limiting.

When the merge candidate list is generated in a predetermined order, if motion information of a neighbor block is identical to motion information of another neighbor block, the motion information of a corresponding neighbor block is not included in the merge candidate list.

In FIG. 12, for example, if neighbor block A is included in the merge candidate list, only when neighbor block B has different motion information from that of neighbor block A, neighbor block B may be included in the merge candidate list. Likewise, neighbor block C may be included in the merge candidate list, only when neighbor block C has different motion information from that of neighbor block B. The same principle is applicable to neighbor blocks D and E. Herein, the same motion information means that motion vectors, reference pictures, and prediction directions (e.g., uni-direction (forward or reverse) or bi-direction) are the same.

However, for a 3D multiview video, the compression efficiency of inter-prediction or intra-prediction at a perspective boundary is decreased due to a perspective difference, which will be described in detail.

Figure 13:
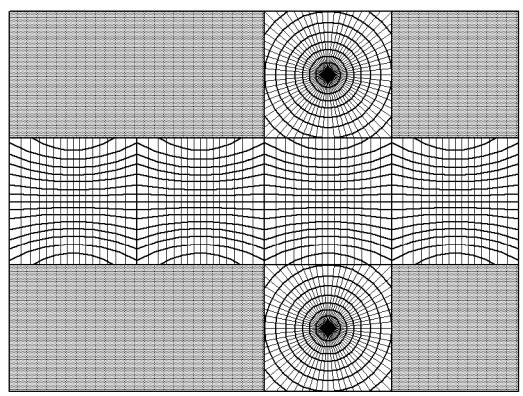
FIG. 13 is a view depicting exemplary real reproduction of a specific video frame of a 3D image of a regular hexahedron 3D video.
Figure 13:
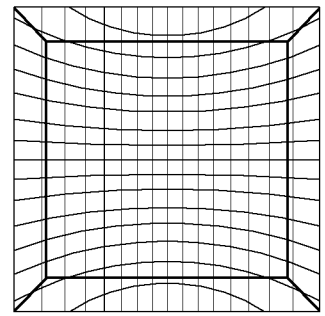

FIG. 13 is a view depicting exemplary real reproductions of a specific frame of a 3D video of a regular hexahedron. (a) of FIG. 13 illustrates a specific frame projected into a planar form of a regular hexahedron, and (b) of FIG. 13 illustrates exemplary reproduction of the specific frame.

Boundaries that define six surfaces are boundaries of perspectives in (a) and (b) of FIG. 13. As illustrated in (b) of FIG. 13, if a 3D image is reproduced, the image is smooth at perspective boundaries. However, if the 3D image is projected into a 2D image, it may be observed in (a) of FIG. 13 that distortion, for example, steep line inclination occurs at a perspective boundary.

Figure 14:
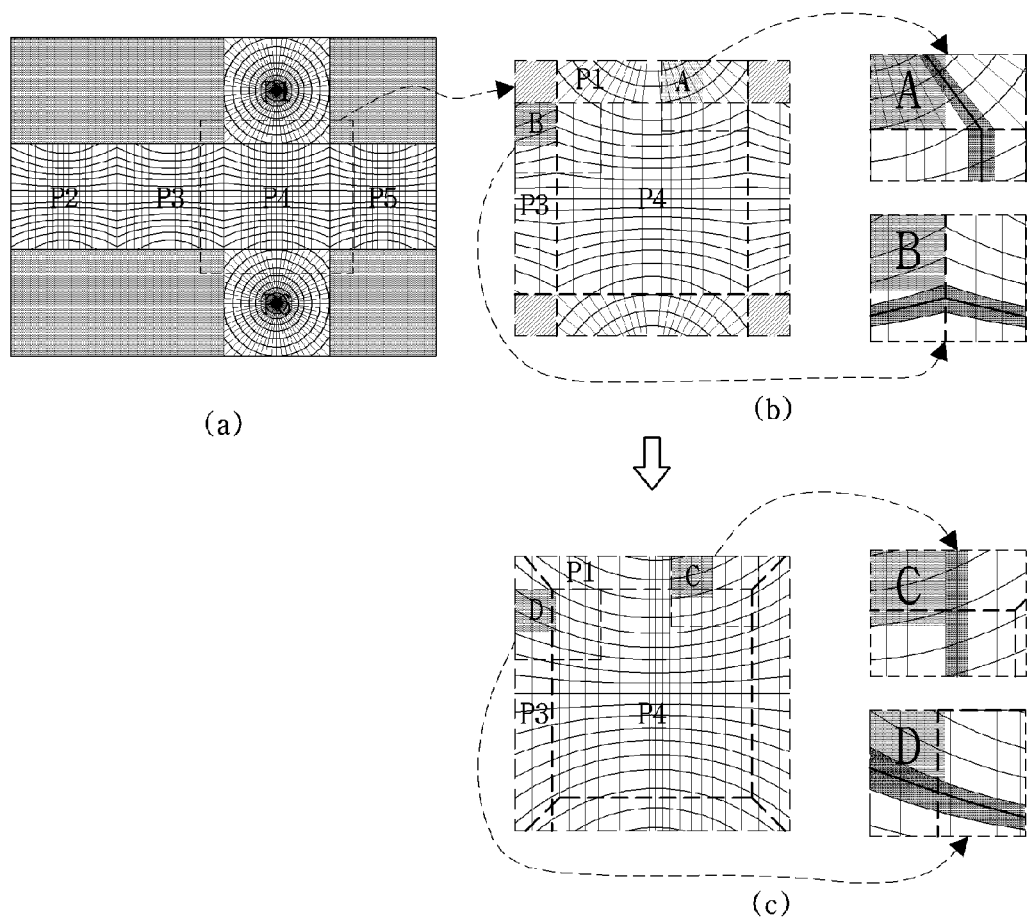
FIG. 14 is a detailed view depicting an exemplary non-linear distortion generated at each surface boundary.

FIG. 14 is a detailed view depicting exemplary occurrence of a non-linear distortion at the boundary of each surface. In FIG. 14, a 3D video of a regular hexahedron is comprised of six surfaces P1 to P6. Each surface has a different perspective.

The shape of an object in a captured image is represented differently according to the perspective of each surface. Therefore, if a specific object is represented continuously at the boundary between two surfaces having different perspectives, a non-linear motion may occur to the object. For example, (b) of FIG. 14 illustrates occurrence of non-linear motions between the surface P3 and the surface P4 and between the surface P4 and the surface P1.

As illustrated in the examples of FIGS. 13 and 14, since a non-linear distortion occurs at a perspective boundary, it may be expected that a correlation between prediction information of blocks will be decreased significantly. Accordingly, it is expected that a correlation between prediction information of blocks at a perspective boundary is remarkably decreased. Prediction information includes motion information (e.g., a motion vector, a reference picture index, or a prediction direction) used for inter-prediction, or a prediction direction (e.g., an intra-prediction mode) used for intra-prediction.

As a result, if temporal prediction is performed for a block included in an area having a specific perspective, using a block included in an area having a perspective different from the specific perspective, it may be expected that encoding/decoding efficiency will be decreased remarkably, compared to the use of a block included in the area having the specific view.

As described above, if it is not appropriate to predict a current image using a temporal reference image, intra block coding or intra-prediction (or spatial prediction) may be used. However, the use of spatial prediction instead of temporal prediction decreases compression efficiency.

Even though intra-prediction is used, the resulting low correlation with a neighbor block makes it difficult to derive an intra-prediction mode from the neighbor block.

In this context, to overcome a problem caused by the decreased prediction efficiency of edge blocks adjacent to a boundary, the present invention proposes a method for linearly correcting a non-linear motion produced at the boundary between blocks having different perspectives, and a method for converting prediction information of a neighbor block having a different view. For example, (c) of FIG. 14 illustrates an example of linearly correcting a non-linear distortion at the boundary between the surfaces P1 and P4 and a non-linear distortion at the boundary between the surfaces P3 and P4.

As illustrated in the example of (c) of FIG. 14, a method for linearly changing a non-linear distortion produced at a perspective boundary will be described below.

Figure 15:
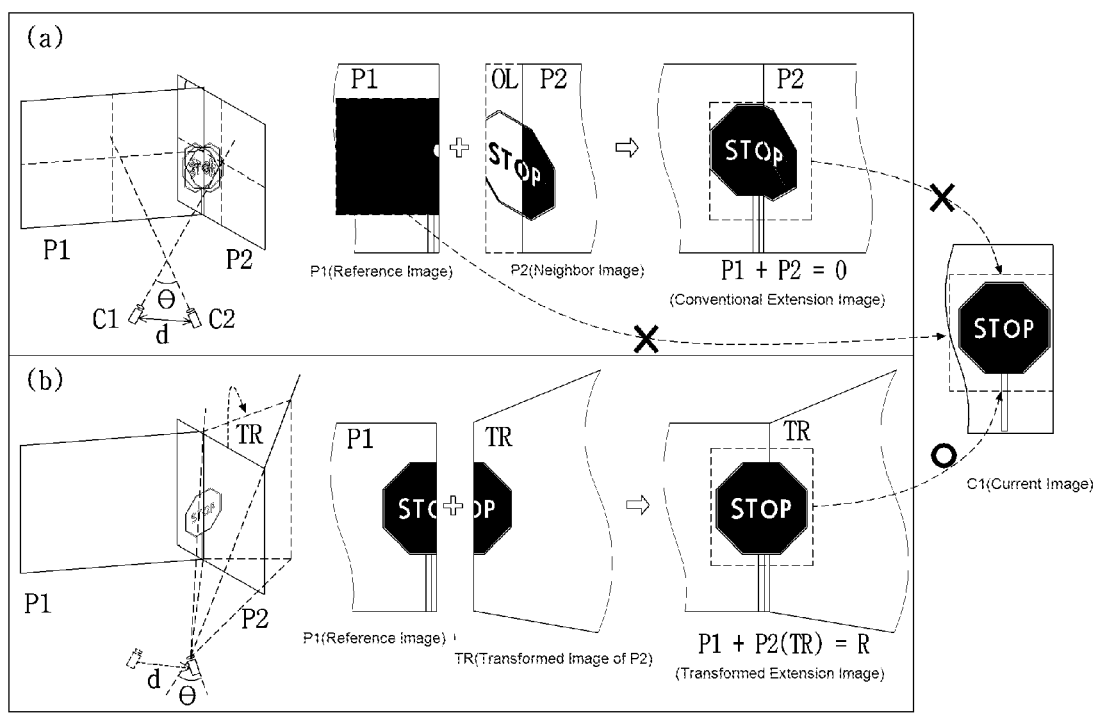
FIG. 15 is a view depicting exemplary generation of a reference image by transforming the view of a neighbor area.

FIG. 15 is a view depicting exemplary generation of a reference image by converting the perspective of a neighbor area.

If there are continuous perspectives in position, the efficiency of temporal prediction may be decreased at a boundary over which one perspective is changed to another perspective in an image. This is because a reference area within a reference image used for prediction does not include information about a neighbor area. Even though the reference area includes the information about the neighbor area, the perspective of the reference area is different from that of a current block, and thus the reference area is not suitable as a reference image.

For example, in the example of FIG. 15, if an area (i.e., P1) that does not include information about a neighbor area is used for reconstructing a partial area C1 of a current image, it is difficult to perfectly reconstruct the current image C1. Even though an area (i.e., P1+P2=O) including information of the neighbor area is used in reconstructing the current image, the current image has a different perspective from that of the newly extended P2 area, thus making it difficult to perfectly reconstruct the current image C1.

Thus, after the neighbor area having a different perspective from that of the reference area is transformed, a reference image is generated, which includes an extended area obtained by combining the reference area with the transformed neighbor area. Therefore, coding efficiency can be increased during temporal prediction.

Specifically, as illustrated in the example of (a) of FIG. 15, an image may be distorted due to a perspective change on a boundary surface between a reference area and a neighbor area. However, as illustrated in the example of (b) of FIG. 15, if the neighbor area is transformed to match the perspective of the reference area, the distortion on the boundary surface is reduced. Accordingly, as illustrated in (b) of FIG. 15, after an image TR is generated by transforming a neighbor area having a different perspective from that of a reference area P1, a transformed extension image R (P1+TR=R) is acquired by combining the reference area P1 with the transformed neighbor area TR. Then, the current image C1 is predicted using the transformed extension image R, thereby increasing prediction accuracy.

To acquire a transformed extension image, the following steps may largely be performed.

Step 1: a direction and distance relationship between images is calculated.

Step 2: a transformed image is generated for each perspective, based on the relationship formula between the images.

Step 3: the transformed image is extended to a reference image according to the viewpoint of an existing reference image.

Step 4: the transformed extension image is inserted in a reference picture list.

Step 1 is a step for calculating a direction and distance relationship between images based on characteristics of an image (e.g., intrinsic nature of a regular hexahedron image) or additional data other than image data (e.g., in the case of a divergent image, the vision angle of each image, an angle difference and a distance difference between perspectives, and so on). The direction and distance relationship between images are denoted by θ and d in (a) of FIG. 15.

Step 2 is a step for generating a transformed version of a neighbor image based on the differences between the directions and distances of the images, calculated in Step 1. In Step 2, the neighbor image being an extended area of the reference image may be modified in a manner that matches the perspective of the reference image. Modifying the neighbor image in a manner that matches the perspective of the reference image means that the neighbor image is transformed so that the neighbor image may reside in a space with the same perspective as that of the reference image.

Step 3 is a step for generating a transformed extension image based on the transformed image and the reference image. Specifically, the transformed extension image may be generated by combining the transformed image with the reference image so that the transformed image may continuous to the reference image.

Step 4 is a step for storing the generated transformed extension image in a reference picture list. As the transformed extension image is stored in the reference picture list, it may be used for temporal prediction of an image to be encoded/decoded.

Since an image suitable for temporal prediction is generated by combining a transformed image with a reference image in the above manner, the encoding/decoding efficiency of an omni-directional video may be increased. The above steps will be described in greater detail with reference to the flowchart of FIG. 16.

Figure 16:
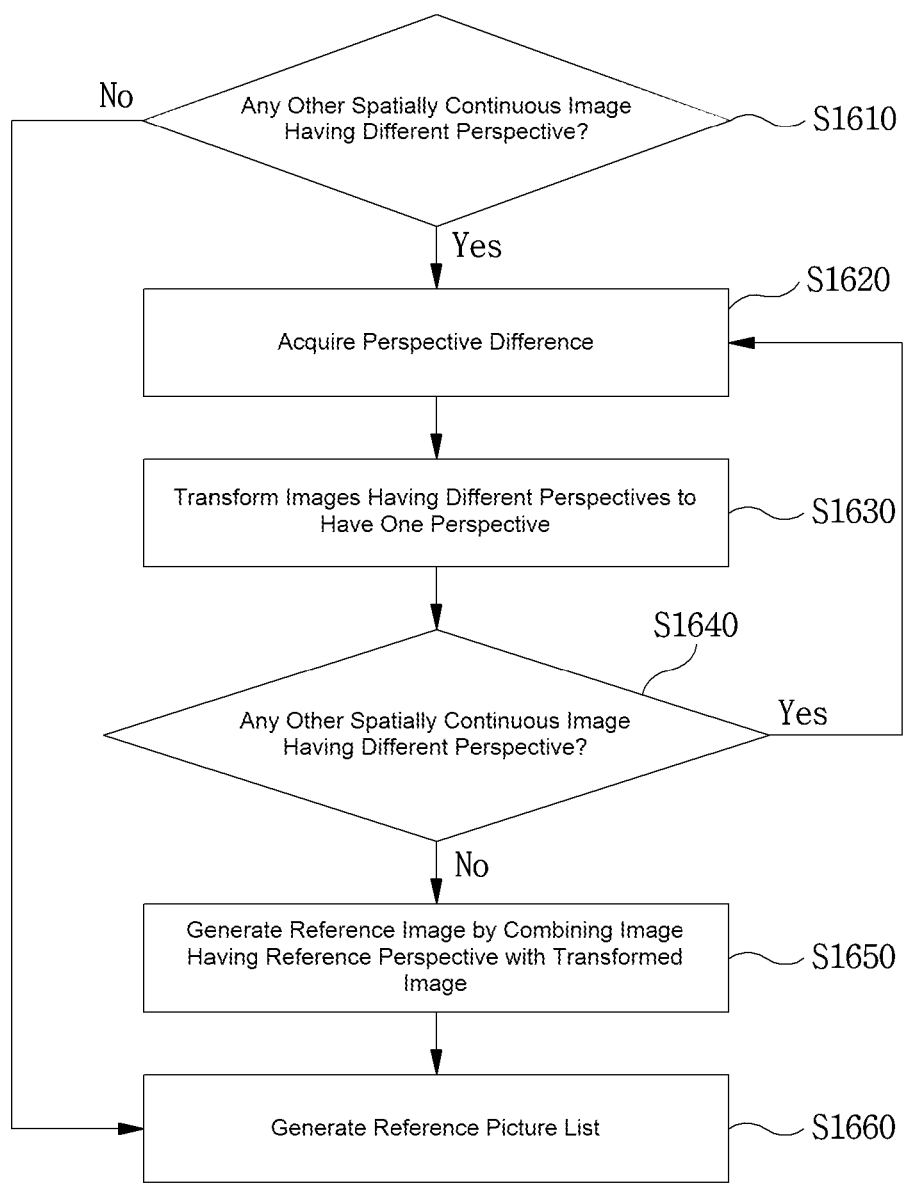
FIG. 16 is a flowchart depicting a procedure for generating a transformed extension image according to the present invention.

FIG. 16 is a flowchart depicting a procedure for generating a transformed extension image according to the present invention.

Referring to FIG. 16, it may be determined whether images having different perspectives are spatially continuous (S1610). The determination may be made based on data added to the images (e.g., metadata) or characteristics of a multiview image (e.g., the planar form of a polyhedron has a fixed number of perspectives). For example, if an image is projected into a planar form of a polyhedron, it may be determined that images having different views are spatially continuous.

If the images having different perspectives are spatially continuous, a perspective difference between the images may be acquired (S1620). The perspective difference may include at least one of an angle difference and a position difference. An angle refers to an Euler angle for 3D representation or its subset, and a position refers to the coordinates of a position in a 3D space, or their subset.

In the case of a 3D multiview image projected into a polyhedron, an angle difference between images having different views may be a fixed value. Further, in the case of a 3D multiview image projected into a polyhedron, images having different perspectives are continuous at their boundary and thus the position difference (or distance difference) may be set to 0.

Figure 17:
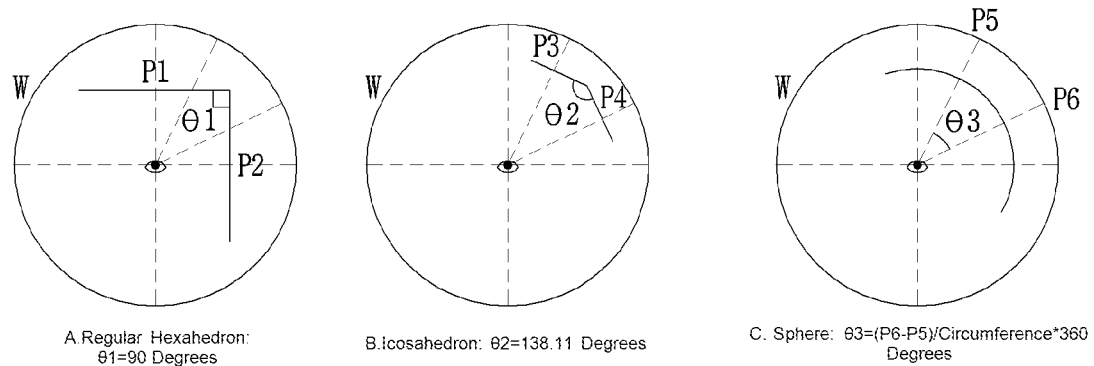
FIGS. 17 and 18 are views depicting characteristics between views.
Figure 18:
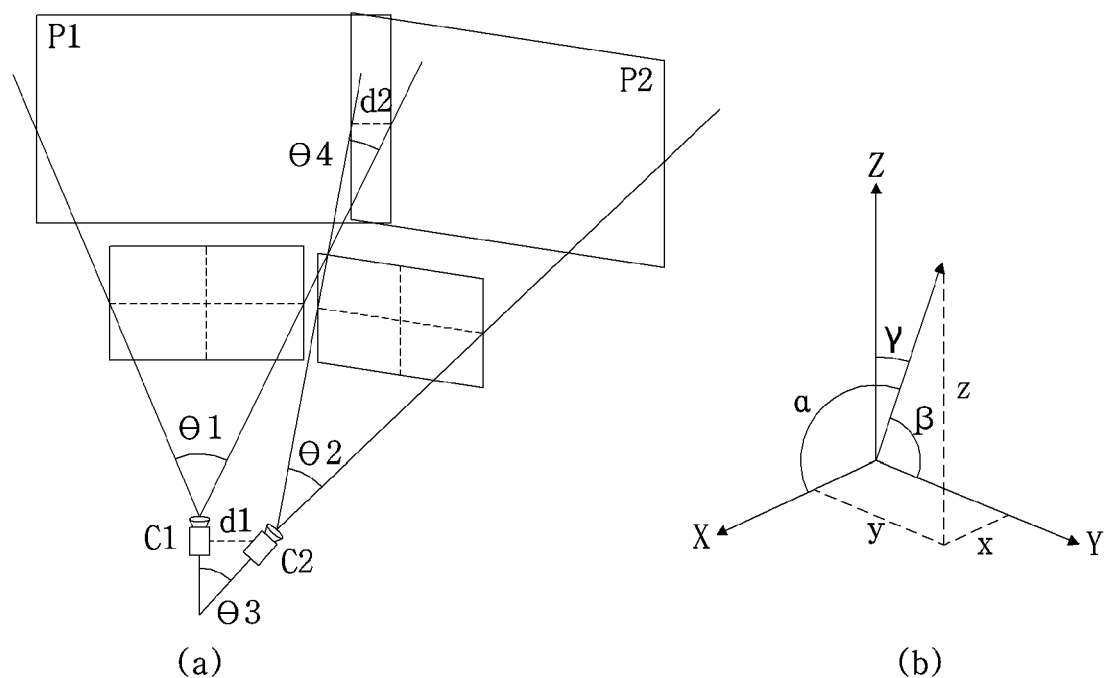

FIGS. 17 and 18 are exemplary views depicting characteristics between perspectives. Characteristics between perspectives may be acquired based on a perspective difference between images having different views. The perspective difference may include at least one of an angle difference and a position difference between the images having different views. An angle refers to an Euler angle for 3D representation or its subset, and a position refers to the coordinates of a position in a 3D space, or their subset.

In the case where a 3D multiview image is unfolded into a polyhedron as illustrated in (a) of FIG. 17, a perspective different may mean an angle difference and a position difference between surfaces having different perspectives. In an image projected into a polyhedron, an angle difference between surfaces having different perspectives may be a fixed value. For example, if a 3D multiview image is projected into a regular hexahedron, an angle difference between two surfaces P1 and P2 having different perspectives is fixed to 90 degrees, as illustrated in (a) of FIG. 17. If a 3D multiview image is projected into a regular dodecahedron, an angle difference between two images P3 and P4 is fixed to 138.11 degrees, as illustrated in (b) of FIG. 17.

As illustrated in the examples of (a) and (b) of FIG. 17, two surfaces having different perspectives are spatially continuous. Thus, a distance difference between the two images may be set to 0.

If a 3D multiview image is a planar form into which a sphere is unfolded or is not projected into a planar form of any polyhedron, an angle difference and a distance difference refer to an angle difference and a position difference between image, which are acquired based on the positions and viewing angles of cameras, an angle difference between the cameras, and so on. For example, if a 3D multiview image is shaped into a sphere as illustrated in (c) of FIG. 17 or if a 3D multiview image is not unfolded into a planar form of any polyhedron as illustrated in FIG. 18, a position difference d2 and an angle difference θ4 between images may be acquired based on the positions of cameras, a position difference d1 between the cameras, the angles θ1 and θ2 of the cameras, and an angle difference θ3 between the angles.

As described above, if a 3D multiview video is shaped into a sphere or a non-polyhedron or if there is no constant rule in image arrangement, a perspective difference between images having different perspectives may be calculated based on the positions and viewing angles of cameras, an angle between the cameras, and so on.

If the perspective difference between the images having different perspectives is calculated, the images having different perspectives may be transformed to have the same perspective based on the calculated perspective difference (S1630). For example, for two images having different perspectives, one of the two images may be transformed to match the perspective of the other image.

Figure 19:
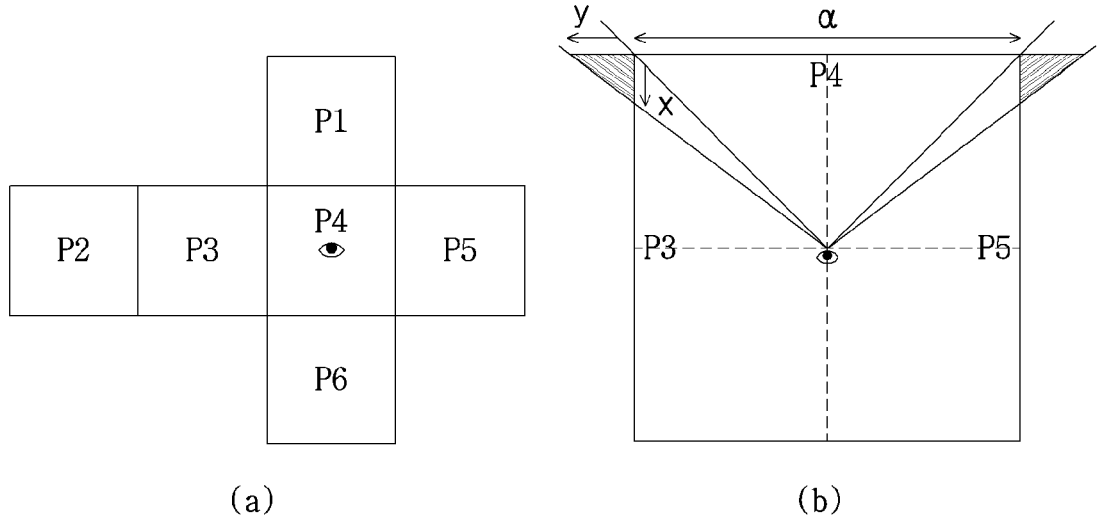
FIG. 19 is a view depicting exemplary transformation of an image according to the view of another image.

FIG. 19 is a view depicting exemplary transformation of an image in a manner that matches the perspective of another image.

(a) of FIG. 19 illustrates an example of a 3D multiview video unfolded into a planar form of a regular hexahedron, and (b) of FIG. 19 illustrates an exemplary planar form of the regular hexahedron, viewed from the top (e.g., P1) or bottom (e.g., P6) of the regular hexahedron.

On the assumption that a 3D multiview image is unfolded into a 2D planar form of a regular hexahedron, as illustrated in (a) of FIG. 19, if a block included in surface P4 of a current image is predicted using a reference area included in surface P4 of a reference image, there is no perspective difference. In contrast, if the block included in the surface P4 of the current image is predicted through a reference area included in the surface P3 of the reference image, prediction efficiency may be decreased due to a perspective difference between the surfaces P4 and P3. Accordingly, there exists a need for, in the case where a block included in the surface P4 is predicted based on a reference area included in the surface P3, generating a reference image by transforming the reference image in the surface P3 to match the perspective of the surface P4 and storing the generated reference image.

For this purpose, as illustrated in the example of (b) of FIG. 19, the surface P3 may be transformed by projecting a position x on the surface P3 to a position y having the same perspective as that of the surface P4. The perspective difference between the surface P3 and the surface P4 may be simplified by [Equation 1].

$$y = \frac{ax}{a - 2x} \quad \text{[Equation 1]}$$

In [Equation 1], a represents the length of one side of a regular hexahedron.

If a reference image obtained by transforming the surface P3 to match the perspective of the surface P4 is used, the surface P3 of the reference image has the same perspective as that of the surface P4. Therefore, the efficiency decrease resulting from predicting the surface P4 of a current image using the surface P3 of a reference image may be avoided.

If there is another spatially neighbor image having a different perspective, the neighbor image may be transformed additionally based on the above principle (S1640).

When neighbor images are transformed based on the perspective of a specific image, a reference image may be generated by combining the specific image with at least one transformed neighbor image (S1650).

For example, if a 3D multiview image is projected into a planar form of a regular hexahedron, a reference image may be generated by transforming a plurality of neighbor surfaces adjacent to a specific surface of the regular hexahedron to match the perspective of the specific surface, and combining the specific surface with the transformed neighbor surfaces.

Figure 20:
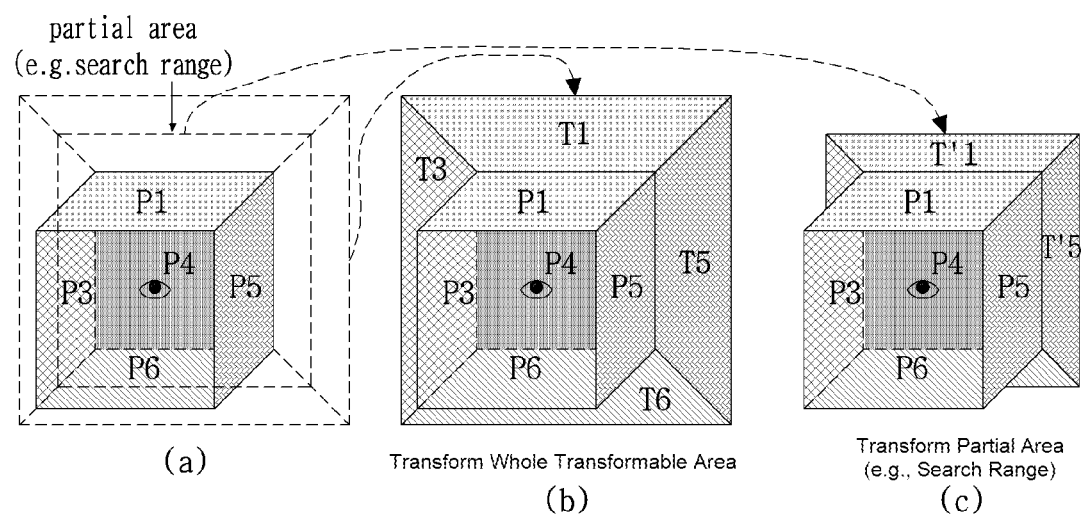
FIGS. 20 and 21 are views depicting exemplary generations of a reference image based on a specific surface of a regular hexahedron.
Figure 21:
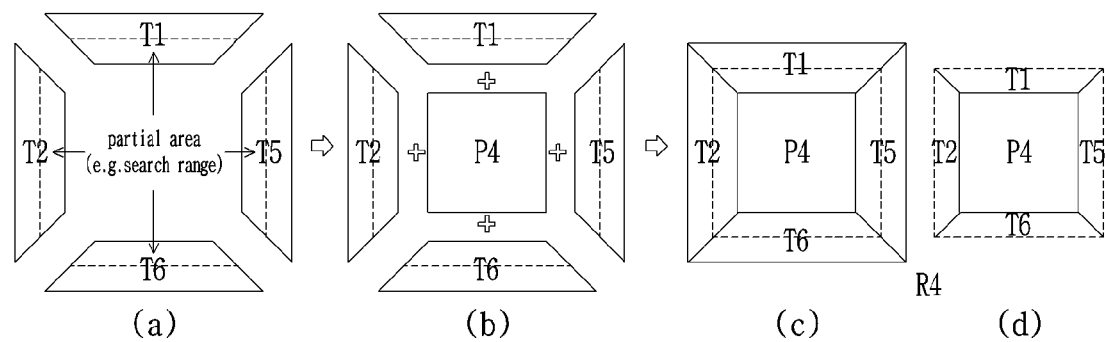

For example, FIGS. 20 and 21 are views depicting exemplary generations of a reference image based on a specific surface of a regular hexahedron. Referring to (a) of FIG. 20, when seen from the surface P4, the surface P4 is neighboring to the surfaces P1, P3, P5, and P6. Therefore, images T1, T3, T5, and T6 may be generated by transforming the surfaces P1, P3, P5, and P6 to match the perspective of the surface P4, and a reference image may be generated by combining the surface P4 with the transformed images T1, T3, T5, and T6.

Although the entire area of a neighbor surface adjacent to the surface P4 may be set as a transformation target, only a partial area (e.g., a search range) of the neighbor surface may be set as the transformation target.

(b) of FIG. 20 is a view depicting an example of generating a reference image in the case where the entire area of a neighbor surface is a transformation target, and (c) of FIG. is a view depicting an example of generating a reference image in the case where a partial area of a neighbor surface is a transformation target.

The position of a wholly or partially transformed image is determined based on an image having a perspective serving as a reference perspective. In the case of an image projected into a polyhedron, the position of a transformed image is determined according to the characteristics of the polyhedron. The transformed image may be combined with the image having the reference perspective according to the position of the transformed image.

For example, in the examples of (a) and (b) of FIG. 21, the positions of the images T1, T3, T5, and T6 are determined relatively to the image P4 with the reference perspective. That is, the transformed images T1, T3, T5, and T6 are combined with the image P4 at positions projected according to the perspective of the image P4.

(c) and (d) of FIG. 21 are views depicting exemplary reference images R4 produced by combining the image P4 with the transformed images T1, T3, T5, and T6. (c) of FIG. 21 is an exemplary view for the case where the whole transformable area of a neighbor image is projected according to the perspective of the image P4, and (d) of FIG. 21 is an exemplary view for the case where a partial area of a neighbor image is projected according to the perspective of the image P4.

In the case where a 3D multiview image is a divergent image, a method for generating a reference image will be described below.

As is done with a 3D multiview image projected into a polyhedron, a divergent image may also be transformed based on an angle difference and a position difference between images having different perspectives. However, compared to the 3D multiview image projected into a polyhedron, there is no predefined rule for arranging images having different perspectives in the divergent image, which makes it difficult to determine a perspective difference (i.e., angle difference and distance difference) between the images with difference perspectives, just with image characteristics. Accordingly, the perspective difference of a divergent image may be encoded/signaled in additional data (e.g., metadata) added to the image. Once a perspective difference between images having different perspectives is acquired from the additional data, transformation may take place between the images in the above-described manner, and a reference image may be generated using the transformation result.

Figure 22:
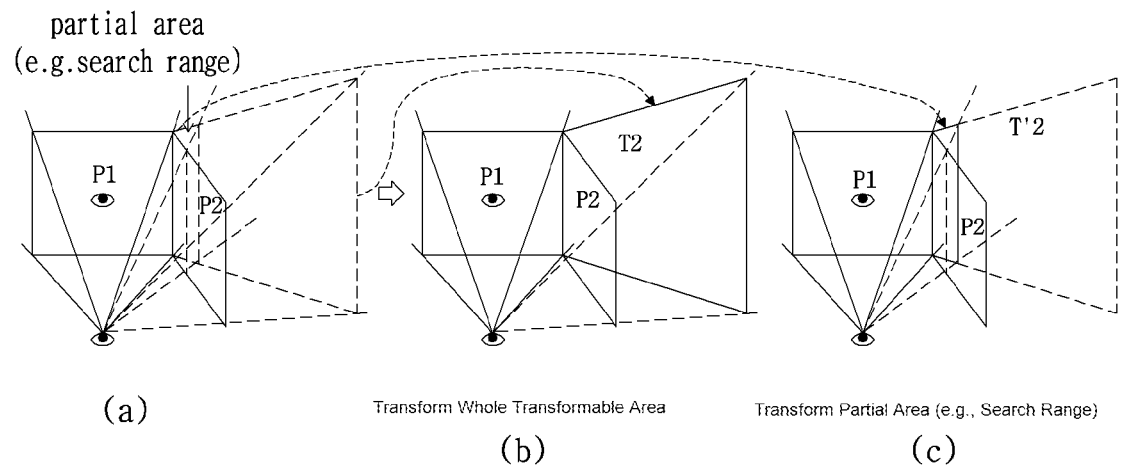
FIG. 22 is a view depicting exemplary generation of a reference image for a divergent image.

For example, FIG. 22 is a view depicting exemplary generation of a reference image for a divergent image. (a) of FIG. 22 illustrates the existence of an image P2 having a different perspective from that of an image P1. If a reference image is generated based on the image P1, the whole or partial area of the image P2 may be transformed to match the perspective of the image P1, and a reference image may be generated by combining the transformed image with the image P1. (b) of FIG. 22 illustrates an example of generating a reference image by combining the image P1 with an image T2 obtained by transforming the whole area of the image P2, and (c) of FIG. 22 illustrates an example of generating a reference image by combining the image P1 with an image T2 obtained by transforming a partial area (e.g., a search range) of the image P2.

For a divergent image, the position of a transformed image may be determined with respect to an image having a reference perspective. Herein, the position of the transformed image may be determined based on position information about each image. If the position of the transformed image is determined, a reference image may be generated by combining the image having the reference perspective with the transformed image.

Figure 23:
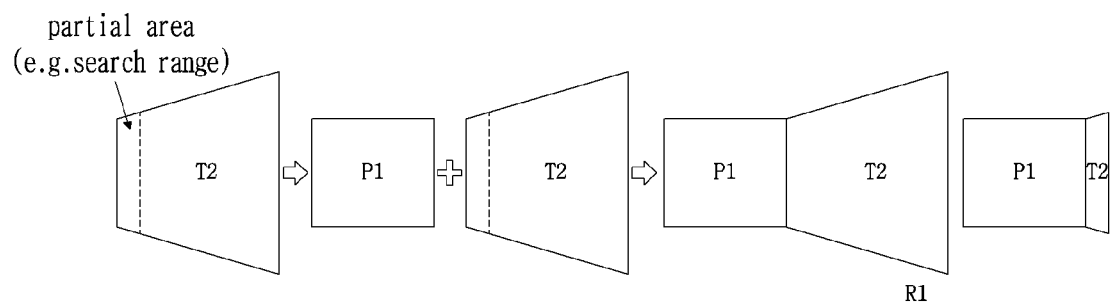
FIG. 23 is a view depicting exemplary generation of a reference image by combining an image of a reference view with a transformed image.

For example, FIG. 23 is a view illustrating exemplary generation of a reference image by combining an image having a reference perspective with a transformed image. In the example of FIG. 23, the image T2 generated by transforming the image P2 is located to the right of the image P1 serving as a divergent reference. Therefore, a reference image R1 may be generated by generating at least a part of the transformed image T2 at the right side of the image P1.

Now a description will be given of a method for generating a reference image, in the case where a 3D multiview image is a convergent image.

Compared to an image projected into a polyhedron or a divergent image, a convergent image is characterized in that each image has a perspective in a specific direction. Accordingly, one frame of the divergent image may include a plurality of images which are spatially continuous to a specific image and extended in the same direction as the specific image. Therefore, when a reference image for a convergent image is generated, there may exist a plurality of transformable neighbor images at the same position as a specific image. As a consequence, the reference image for the convergent image may be generated based on the specific image and an image obtained by transforming at least one of the plurality of neighbor images at the same position as the specific image.

If there is not a great spatial position difference between images with different perspectives, as is the case with a convergent image, an image generated by transforming a neighbor image of a specific image may be considered in the following aspects.

In one aspect, a neighbor image transformed based on the perspective of a specific image includes a sufficient area that does not overlap with the specific image. In other words, an extension area (i.e., a part of the transformed neighbor image, which does not overlap with the specific image) added to a specific area includes necessary information (e.g., an area needed for temporal prediction). In this case, a reference image may be generated in the same manner as a reference image for an image projected into a polyhedron or a divergent image.

In another aspect, most of a neighbor image transformed based on the perspective of a specific image overlaps with the specific image. In other words, an extension area added to a specific area does not include sufficient necessary information (e.g., an area needed for temporal prediction). If the extension area added to the specific area does not include sufficient additional information, it is difficult to use a reference image for temporal prediction.

Each of the aspects will be described below in detail with reference to FIG. 24.

Figure 24:
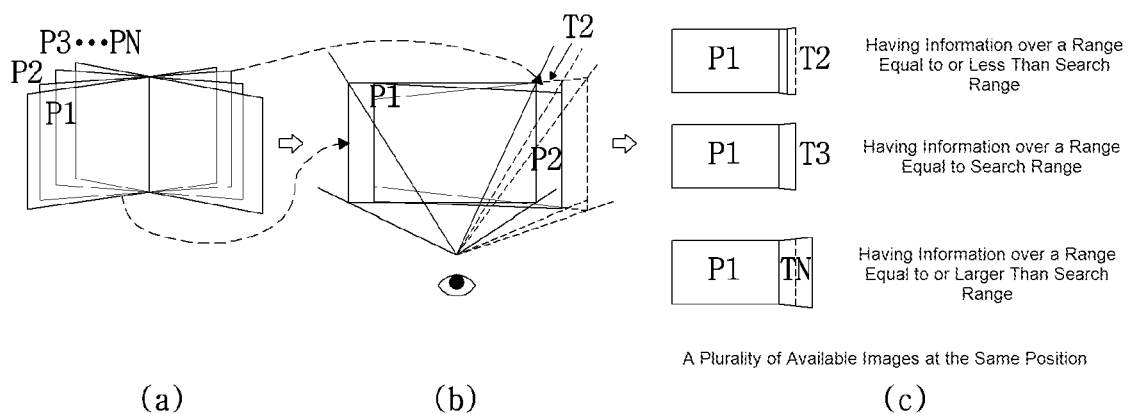
FIG. 24 is a view depicting inclusion or non-inclusion of a necessary area for temporal prediction in a transformed image.

FIG. 24 is a view depicting inclusion or non-inclusion of a necessary area for temporal prediction in a transformed image.

For the convenience of description, it is assumed that a convergent image includes a plurality of images p1, P2, P3, . . . , PN, as illustrated in (a) of FIG. 24. (b) of FIG. 24 illustrates an example of transforming the image P2 neighboring to the image P1 to match the perspective of the image P1. As illustrated in (b) of FIG. 24, a reference image for the image P1 may be generated by transforming at least one image neighboring to the image P1 to match the perspective of the image P1. The transformed neighbor image may or may not include a full necessary area according to how much the neighbor image overlaps with the image P1. For example, in (c) of FIG. 24, an image T2 obtained by transforming the image P2 includes an area smaller than a necessary area (e.g., a search range), whereas an image T3 obtained by transforming the image P3 includes a necessary area (e.g., a search range).

If a transformed image does not include a minimum necessary area, like the image T2 illustrated in (c) of FIG. 24, it may be difficult to perform temporal prediction with a reference image generated based on the image T2. In this case, the reference image may be extended by padding the area insufficient for temporal prediction with pixel values of the transformed neighbor area. That is, an area that cannot be acquired from the transformed version of the neighbor image in the area necessary for temporal prediction may be padded with edge samples of the transformed neighbor area.

Figure 25:
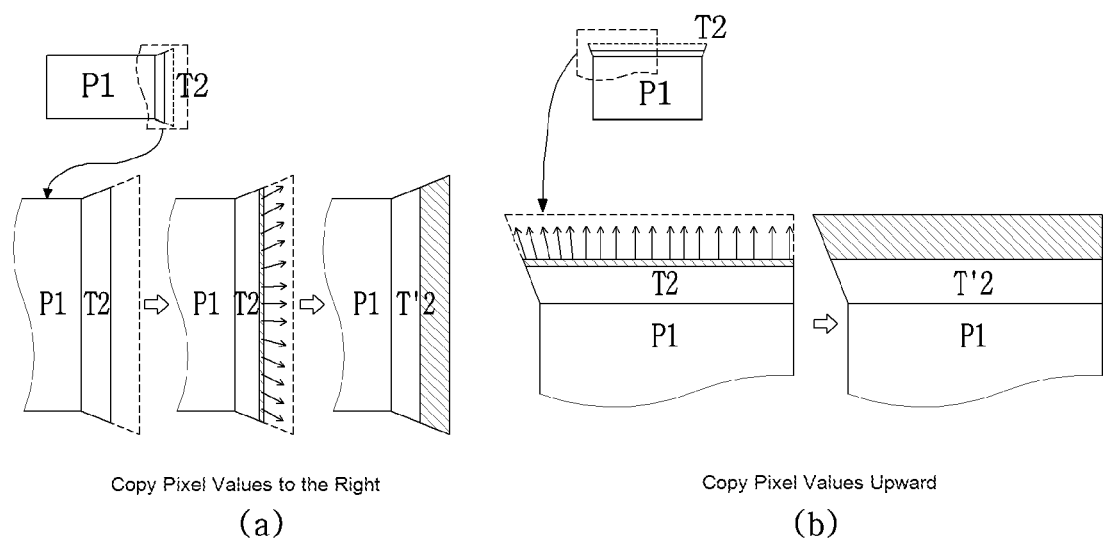
FIG. 25 is a view depicting exemplary generation of a reference image for a convergent image.

FIG. 25 is a view depicting exemplary generation of a reference image for a convergent image. As described before with the transformed image T2 illustrated in (c) of FIG. 25, if a remaining area of the image P2 except for an overlap part between the image P2 and the image P1 is not sufficiently wide, the image T2 obtained by transforming the image P2 may not include a necessary area for temporal prediction. In this case, as illustrated in (a) and (b) of FIG. 25, the necessary area for temporal prediction may be padded with edge samples of the image T2.

(a) of FIG. 25 illustrates an example of padding right edge samples in a remaining area, when the image P2 is transformed to be extended to the right, and (b) of FIG. 25 illustrates an example of padding top edge samples in a remaining area, when the image P2 is transformed to be extended upward.

While FIG. 25 has been described in the context of a convergent image by way of example, if a transformed image does not include a sufficient necessary area for prediction in an omni-directional image or a divergent image, a reference image may be extended using edge samples of the transformed image.

For a convergent image, the position of a transformed image may be determined based on an image with a reference perspective. Herein, the position of the transformed image may be determined based on position information about each image. Since a plurality of transformed images extended in the same direction may be acquired in the convergent image, at least one reference image may be generated by combining an image having a reference perspective with each transformed image.

Figure 26:
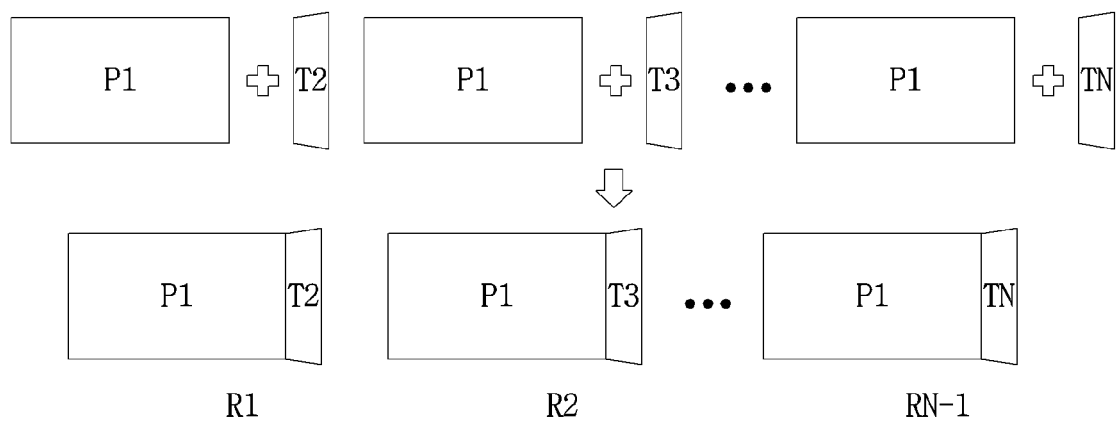
FIG. 26 is a view depicting exemplary generation of a reference image by combining an image of a reference view with a transformed image.

For example, FIG. 26 is a view depicting exemplary generation of reference images by combining an image having a reference perspective with transformed images. In the example of FIG. 26, a reference image R1 may be generated by combining an image P1 with an image T2 generated by transforming an image P2, and a reference image R2 may be generated by combining the image P1 with an image T3 generated by transforming an image P3. In the same manner, (N-1) transformed images may be generated for N transformed images based on the image P1.

Once a reference image is generated, the reference image may be stored in the reference picture list (S1660). On the other hand, if there is no other spatially continuous image having a different perspective in step S1610, the current image may be stored as a reference image in the reference picture list (S1660).

If the generated reference image is stored in the reference picture list, the reference image may be grouped and stored, with respect to the same time.

Figure 27:
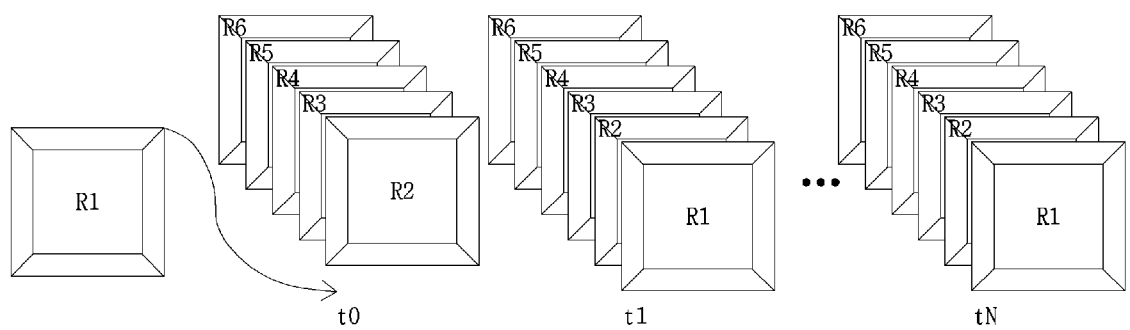
FIG. 27 is a view depicting exemplary generation of a reference image list for a 3D multiview video unfolded into a regular hexahedron.

FIG. 27 is a view depicting exemplary generation of a reference picture list for a 3D multiview image unfolded into a regular hexahedron.

If a 3D multiview image is unfolded into a regular hexahedron, one reference image may be generated for an image having a specific perspective at a specific time. Since a total of six images (i.e., each surface of the regular hexahedron) are available as images with reference perspectives at a specific time, up to six reference images may be generated for the specific time. In this case, the six reference images may be grouped and stored, for the specific time.

For example, for an omni-directional image at time t0, a total of six reference images (a reference image R1 based on the perspective of P1, a reference image R2 based on the perspective of P2, . . . , reference image R6 based on the perspective of P6) may be generated. The reference images generated for time t0 may be grouped into one group and stored. Likewise, reference picture lists for time t1, t2, . . . , tN may be grouped on a time basis and stored in a list.

Figure 28:
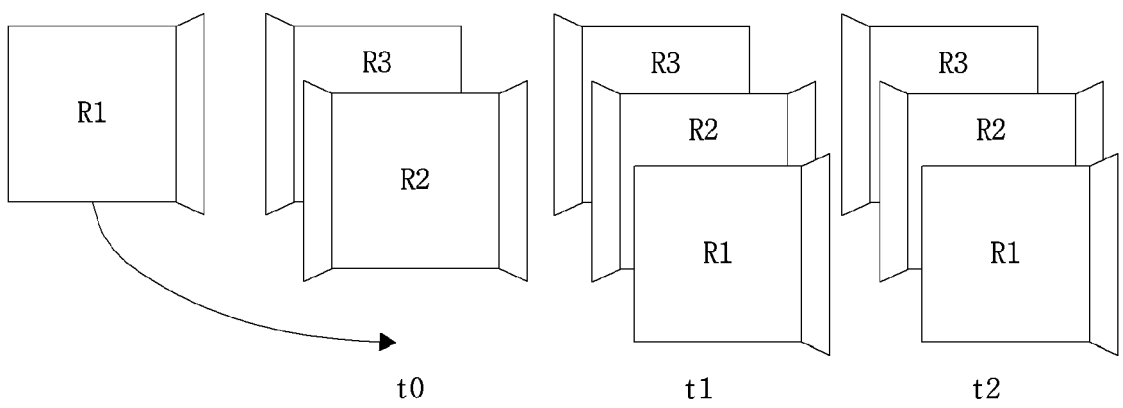
FIG. 28 is a view depicting exemplary generation of a reference image list for a divergent image.

FIG. 28 is a view depicting exemplary generation of a reference picture list for a divergent image.

In the case of a divergent image, one reference image may be generated based on an image with a specific perspective at a specific time. The number of images with reference perspectives is determined by the number of cameras capturing the divergent image, and thus as many reference images as the number of cameras may be generated for the specific time. Like an omni-directional image unfolded into a polyhedron, a plurality of reference images may be grouped on a time basis and stored.

For example, on the assumption that a total of three reference images (a reference image R1 generated based on the perspective of P1, a reference image R2 generated based on the perspective of P2, and a reference image R3 generated based on the perspective of P3) are generated for a divergent image at time t0, the three reference images generated for time t0 may be grouped into one group and stored. In the same manner, reference picture lists for times t1, t2, . . . , tN may be grouped on a time basis and stored in a list.

Figure 29:
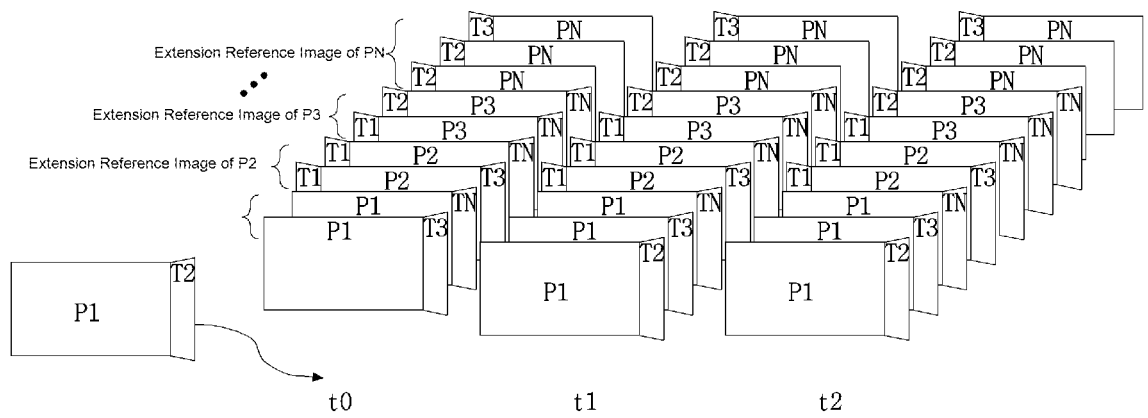
FIG. 29 is a view depicting exemplary generation of a reference image list for a convergent image.

FIG. 29 is a view depicting exemplary generation of a reference picture list for a convergent image.

In the case of a convergent image, at least one reference image may be generated based on an image with a specific perspective at a specific time. For example, if the image P1 is an image with a reference perspective, a first reference image R1 may be generated based on the image P1 and an image P2, and a second reference image may be generated based on the image P1 and an image P3. Like an omni-directional image, a plurality of reference images of a convergent image at a specific time may be grouped into the same group and stored.

For example, for a convergent image at time t0, N reference images generated based on the perspective of P1, N reference images generated based on the perspective of P2, . . . , N reference images generated based on the perspective of PN may exist. In this case, a plurality of reference images generated for time t0 may be grouped into one group and stored. In the same manner, reference picture lists for t1, t2, ..., tN may be grouped according to a specific time and stored in a list.

FIGS. 27, 28, and 29 are views depicting examples of grouping and storing a plurality of reference images on a time basis. Unlike FIGS. 27, 28, and 29, a plurality of reference images may be grouped and stored according to an image with a reference perspective.

To select a reference image, information for reference image selection may be encoded/signaled. The information for reference image selection may include at least one of information about a time including reference images and identification information identifying at least one of a plurality of reference images for the time.

Referring to FIG. 27, for example, if the information for reference image selection indicates a reference image generated based on the perspective of P1 at time t0, the reference image for time t0 may be used for temporal prediction.

In another example, which one of a plurality of reference images for a specific time is to be selected may be determined based on the position of a current area to be encoded/decoded. For example, if the current area to be encoded/decoded is included on the surface P6 of a regular hexahedron, an encoder and a decoder may use a reference image generated based on the perspective of P6 for temporal prediction.

As described above, if spatial neighbor images have different perspectives, the shape of a projected object may be distorted at the boundary between the images according to the perspectives. Encoding/decoding efficiency decreased by the distortion at the boundary between images may be increased by transforming a neighbor image (or area) based on the perspective of an image (or area) for use in referencing.

Figure 30:
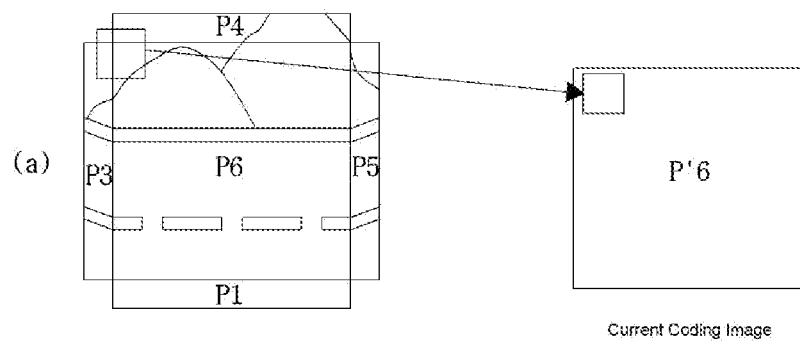
FIG. 30 is a view comparing generation of a reference image according to the present invention with non-generation of a reference image.
Figure 30:
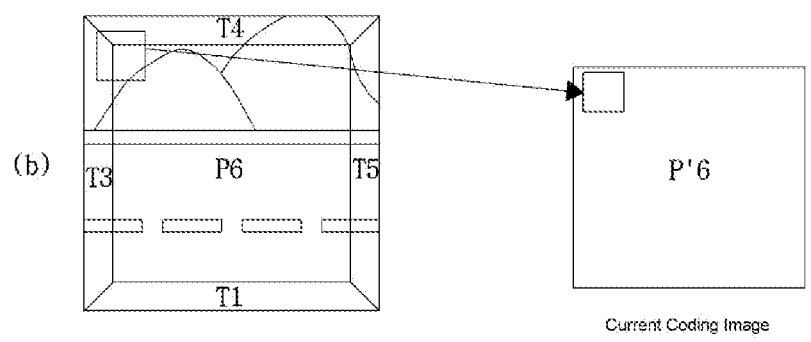

FIG. 30 is a view comparing a reference image generated according to the present invention with a reference image generated in a manner different from the present invention.

As illustrated in the example of (a) of FIG. 30, if temporal prediction is performed without transformation of a neighbor image, a distortion occurs at a surface boundary due to a perspective difference. In (a) of FIG. 30, a non-linear distortion occurs at a boundary of the surface P6. As a result, when temporal prediction is to be performed based on a boundary of a specific image, temporal prediction efficiency may be reduced due to a perspective difference.

In the example of (b) of FIG. 30, however, if a reference image is generated by transforming a neighbor image and temporal prediction is performed based on the generated reference image, a distortion at a surface boundary may be reduced remarkably. A non-linear change at the boundary of the surface P6 is shown as transformed linearly in (b) of FIG. 30. Accordingly, even though temporal prediction is performed based on the boundary of a specific image, temporal prediction efficiency may be increased due to less distortion caused by a perspective difference.

If temporal prediction is performed without transforming a neighbor image as in the above example, it is difficult to perform temporal prediction based on a block at an image boundary during video encoding/decoding. Therefore, it is typical to encode edge blocks adjacent to a boundary over which a perspective changes by spatial prediction instead of temporal prediction.

However, if temporal prediction is performed based on a reference image generated by transforming a neighbor image as proposed in the present invention, temporal prediction may be performed based on a block at an image boundary during video encoding/decoding. Accordingly, as edge blocks adjacent to a boundary over which a perspective is changed can also be encoded/decoded by temporal prediction, video compression efficiency can be increased.

Figure 31:
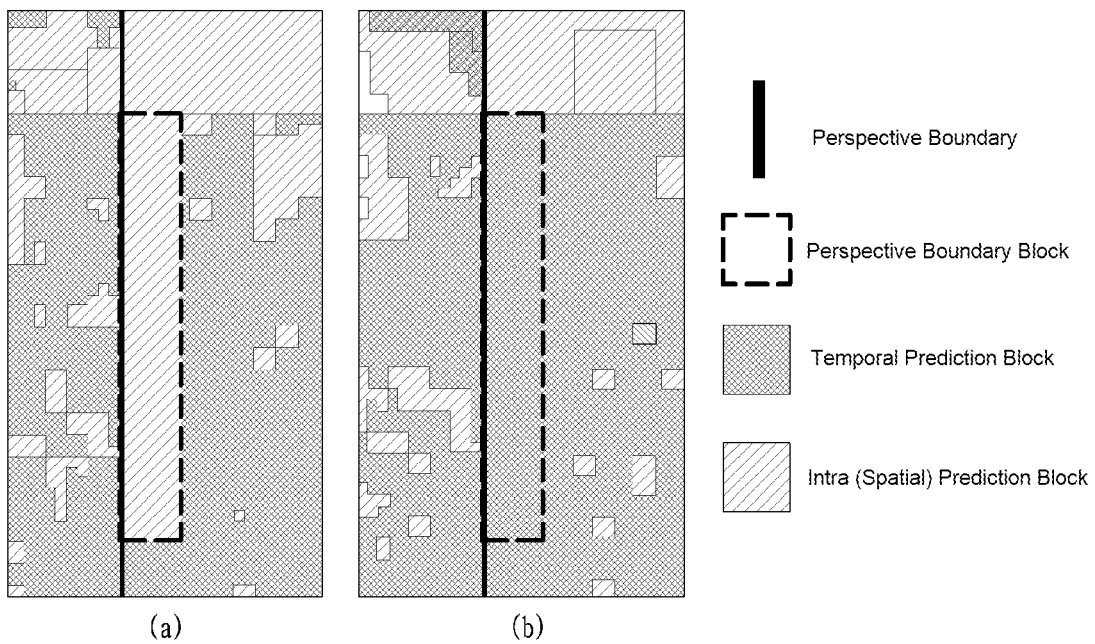
FIG. 31 is a view depicting encoding depending on whether the present invention is applied or not.

For example, FIG. 31 is an exemplary view depicting encoding to which the present invention is applied and encoding to which the present invention is not applied. As illustrated in the examples of (a) of FIG. 31, blocks at a perspective boundary is generally encoded by intra-prediction, if the present invention is not applied. On the other hand, if the present invention is applied as illustrated in (b) of FIG. 31, blocks at a perspective boundary may be encoded by temporal prediction.

According to the present invention, whether to extend an image to be used for prediction may be encoded to a coding parameter and signaled in a bit stream. For example, information indicating whether to extend an image to be used for prediction may be encoded to a 1-bit flag and signaled. If the flag indicates that the image to be used for prediction will be extended, a neighbor image may be transformed according to the perspective of a specific image, and a reference image may be generated by combining the specific image with the transformed neighbor image. On the contrary, if the flag does not indicate that the image to be used for prediction will be extended, perspective-based transformation and extension of a specific image may not be performed.

The information indicating that an image to be used for prediction will be extended may be signaled in a parameter set, on a picture basis, on a slice basis, or a coding unit basis. [Table 1] illustrates an example of signaling the information indicating that an image to be used for prediction by VPS, and [Table 2] illustrates an example of signaling the information indicating that an image to be used for prediction by SPS.

TABLE 1 seq_parameter_set_rbsp( ) {
vps_video_parameter_set_id
vps_reserved_three_2bits
vps_max_layers_minus1
...
perspective_reference_picture_enabled_flag
...

TABLE 2 seq_parameter_set_rbsp( ) {
sps_video_parameter_set_id
sps_max_sub_layers_minus1
sps_temporal_id_nesting_flag
...
perspective_reference_picture_enabled_flag
...

In [Table 1] and [Table 2], 'perspective_reference_picture_enabled_flag' indicates whether an image to be used for prediction will be extended. If an image to be used for prediction is to be extended as proposed by the present invention, 'perspective_reference_picture_enabled_flag' may be set to '1', whereas if an image to be used for prediction is not extended, 'perspective_reference_picture_enabled_flag' may be set to '0'. Or 'perspective_reference_picture_enabled_flag' may be set to the opposite values to the above values to indicate whether an image to be used for prediction will be extended.

If 'perspective_reference_picture_enabled_flag' is '1', when a reference image is configured, an extended reference image may be generated in consideration of the direction and position of the image. Further, prediction may be performed based on the extended reference image.

Now, a description will be given of a method for transforming prediction information of a perspective boundary based on the characteristics of perspectives and increasing a correlation between blocks using the transformed prediction information.

Figure 32:
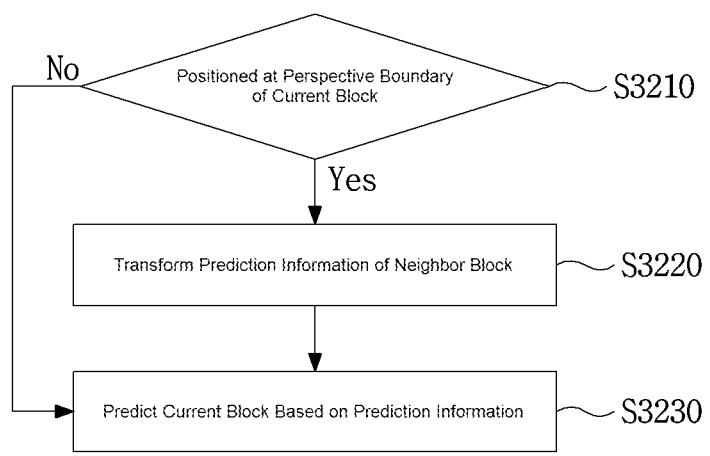
FIG. 32 is a flowchart illustrating a method for transforming prediction information according to the present invention.
Figure 33:
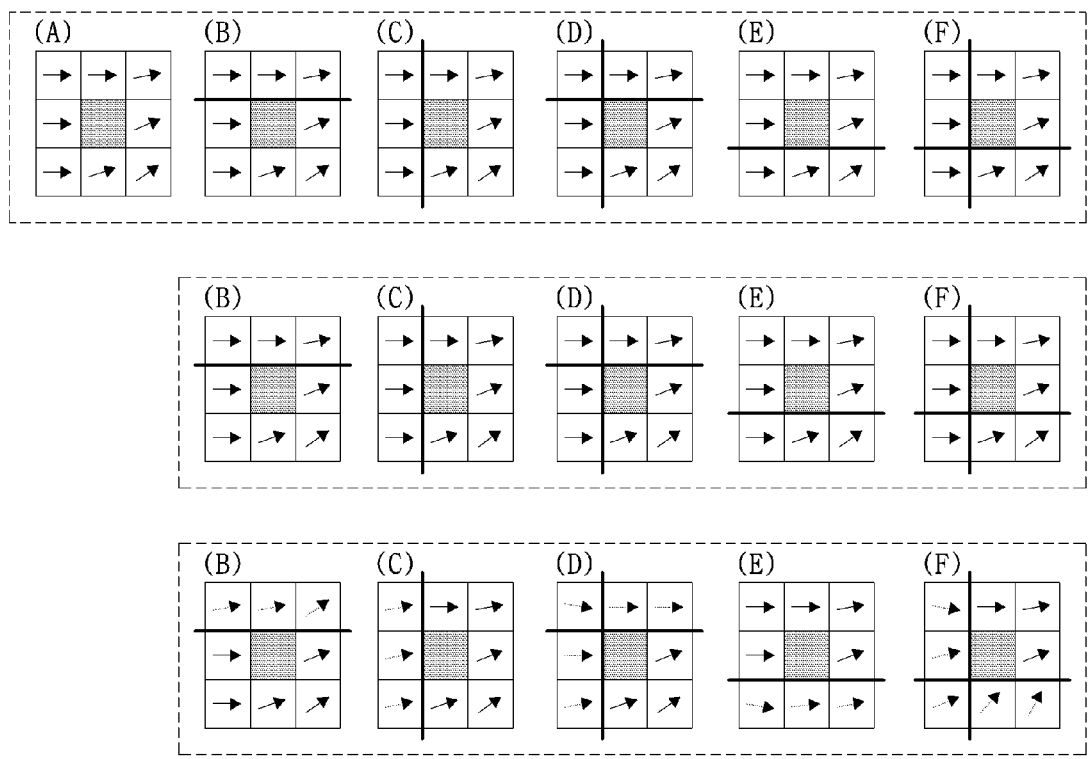
FIG. 33 is a view depicting exemplary transformation of prediction information at a perspective boundary.

FIG. 32 is a flowchart illustrating a method for transforming prediction information according to the present invention, and FIG. 33 is a view depicting exemplary transformation of prediction information at perspective boundaries. In the example of FIG. 33, slashed blocks represent current blocks to be encoded/decoded (e.g., CUs or PUs). Arrows within neighbor blocks adjacent to a current block represent prediction information. A solid arrow represents pre-transformation prediction information, and a dotted arrow represents post-transformation prediction information. A bold line between blocks represents a boundary between perspectives.

First, it is determined whether a current block is located at a perspective boundary (S3210). If it is said that a current block is located at a perspective boundary, this implies that the current block is adjacent to the perspective boundary. In (A) of FIG. 33, a current block is not located at a perspective boundary, and in (B) to (F) of FIG. 33, a current block is located at a perspective boundary.

If a current block is not located at a perspective boundary, prediction information of a neighbor block adjacent to the current block is not transformed. On the contrary, if the current block is located at the perspective boundary, prediction information of a neighbor block with a different perspective from that of the current block may be transformed (S3220). Herein, the transformation may be performed based on characteristics between perspectives.

Characteristics between perspectives may refer to a perspective difference between images with different perspectives. A perspective difference between images with different perspectives has been described before with reference to FIGS. 17 and 18, and thus will not be described in detail herein.

Referring to FIG. 32 again, the current block may be predicted using prediction information of a neighbor block (S3230). The prediction information of the neighbor block may be transformed prediction information or non-transformed prediction information depending on whether the current block is located at a perspective boundary.

An example of predicting a current block using prediction information of a neighbor block will be described in greater detail.

Figure 34:
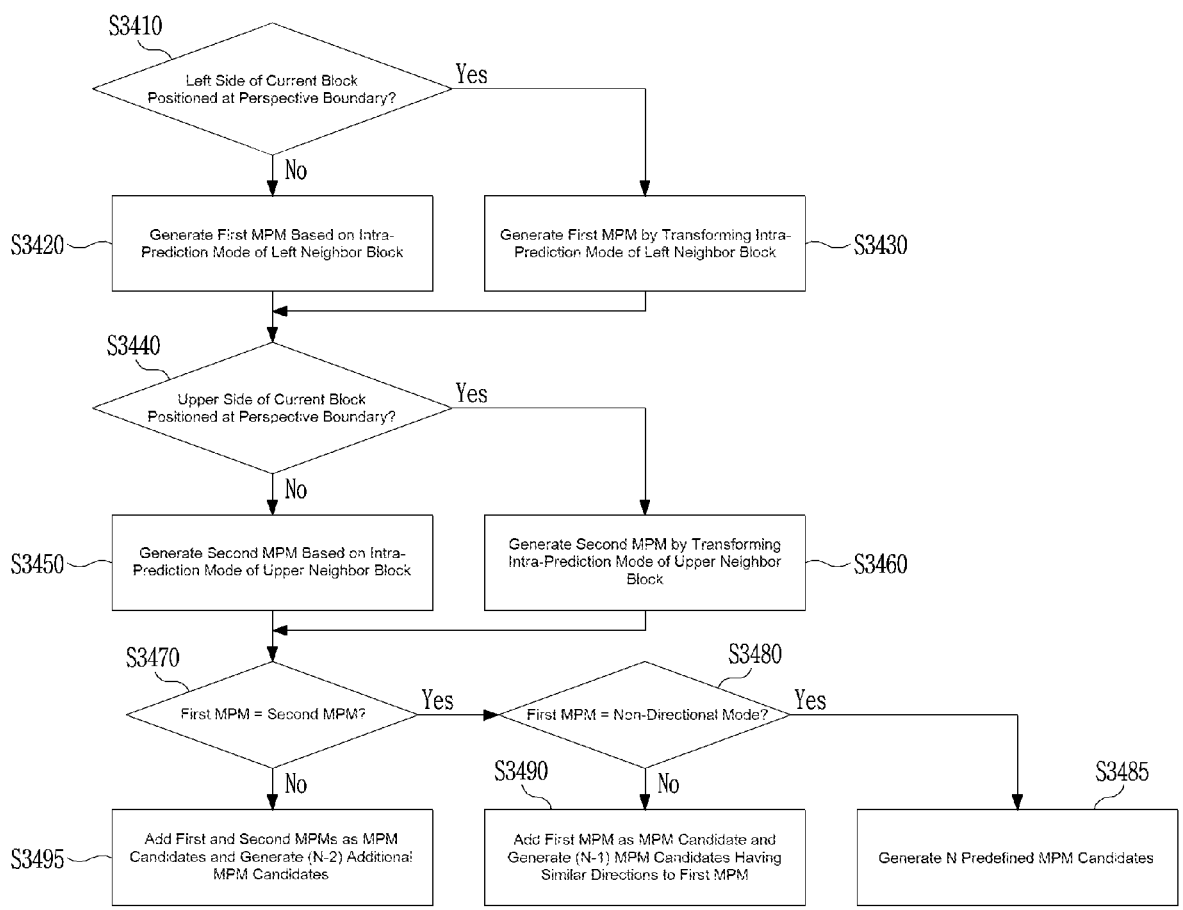
FIG. 34 is a flowchart depicting a procedure for determining a Most Probable Mode (MPM) candidate for intra-prediction based on prediction information of a neighbor block.

FIG. 34 is a flowchart illustrating a procedure for determining Most Probable Mode (MPM) candidates for performing intra-prediction. Herein, intra-prediction information may include an intra-prediction mode (or MPM) of a neighbor block.

To acquire an intra-prediction mode for the current block, MPM candidates may be determined based on intra-prediction modes of neighbor blocks adjacent to the current block, and an MPM candidate list may be generated based on the determined MPM candidates. If the intra-prediction mode of the current block is included in the MPM candidate list, index information indicating the corresponding MPM candidate may be encoded/signaled. The neighbor blocks adjacent to the current block may include a neighbor block to the left of the current block, a neighbor block above the current block, and the like. Also, the neighbor blocks may include a neighbor block at a left upper end of the current block, a neighbor block at a right upper end of the current block, or a neighbor block at a left lower end of the current block.

For the convenience of description, it is assumed that MPM candidates for the current block are derived from the left neighbor block and the upper neighbor block of the current block.

In the following embodiments, intra-prediction mode transformation may be performed only when the intra-prediction mode of a neighbor block is a directional mode. If the intra-prediction mode of the neighbor block is a non-directional mode (e.g., a DC or planar mode), an MPM may be generated without intra-prediction mode transformation.

Referring to FIG. 34, it is determined whether the left side of the current block is adjacent to a perspective boundary (S3410). If the left side of the current block is adjacent to a perspective boundary, a first MPM may be generated by transforming the intra-prediction mode of the left neighbor block to the left of the current block (S3420).

If the left side of the current block is not adjacent to a perspective boundary, the intra-prediction mode of the left neighbor block to the left of the current block may be used as the first MPM (S3430).

Subsequently, it is determined whether the upper side of the current block is adjacent to a perspective boundary (S3440). If the upper side of the current block is adjacent to a perspective boundary, a second MPM may be generated by transforming the intra-prediction mode of the upper neighbor block above the current block (S3450).

If the upper side of the current block is not adjacent to a perspective boundary, the intra-prediction mode of the upper neighbor block above the current block may be used as the second MVM (S3460).

Figure 35:
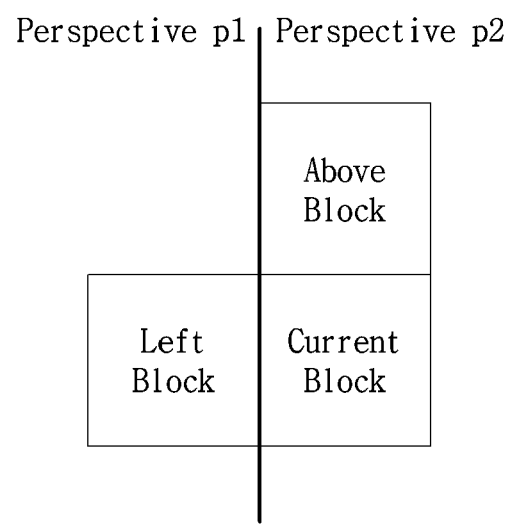
FIGS. 35, 36, and 37 are views depicting exemplary generations of an MPM candidate depending on whether a current block is located at a perspective boundary.
Figure 36:
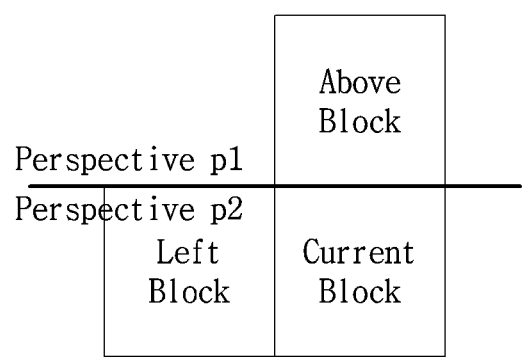
Figure 37:
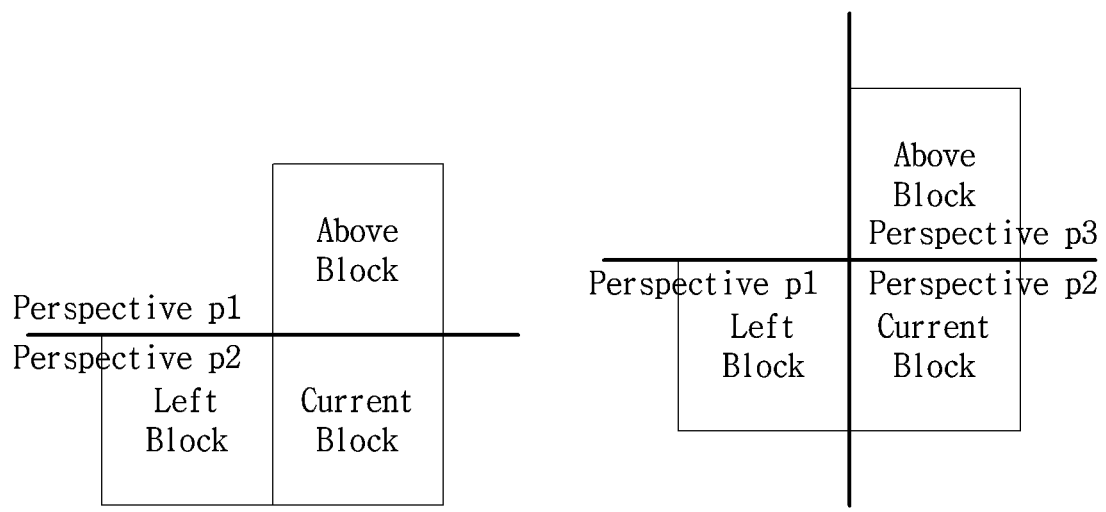

FIGS. 35, 36, and 37 are views depicting exemplary generation of MPM candidates depending on whether a current block is located at a perspective boundary.

Referring to FIG. 35, the current block and its left neighbor block are adjacent to each other with respect to a boundary between perspectives P1 and P2. A first MPM may be generated by transforming an intra-prediction mode of the left block based on a perspective difference between the perspectives P1 and P2.

No boundary exists between the perspectives of the current block and the upper neighbor block. Thus, a second MPM may be generated based on an intra-prediction mode of the upper neighbor block.

Referring to FIG. 36, no boundary exists between the perspectives of a current block and a left neighbor block. Thus, a first MPM may be generated based on the intra-prediction mode of the left neighbor block.

On the other hand, the current block and the upper neighbor block are adjacent to each other with respect to a boundary between perspectives P1 and P2. A second MPM may be generated by transforming an intra-prediction mode of the upper block based on a perspective difference between the perspectives P1 and P2.

Referring to FIG. 37, a current block and its left neighbor block are adjacent to each other with respect to a boundary between perspectives P1 and P2. A first MPM may be generated by transforming an intra-prediction mode of the left block based on a perspective difference between the perspectives P1 and P2.

The current block and its upper neighbor block are also adjacent to each other with respect to a boundary between perspectives P2 and P3. A second MPM may be generated by transforming an intra-prediction mode of the upper neighbor block based on a perspective difference between the perspectives P2 and P3.

Once the first MPM and the second MPM are generated, it is determined whether the first MPM and the second MPM are the same (S3470). If the first MPM and the second MPM are the same, it is determined whether the first MPM is a non-directional mode (i.e., whether the intra-prediction mode is less than 2) (S3480). If the first MPM is a non-directional mode, N predefined MPM candidates may be generated (S3485). N may be a natural number equal to or larger than 1, for example, 2, 3 or 4. For example, if the first MPM is a non-directional mode (e.g., a DC or planar mode), three fixed MPM candidates, planar prediction, DC prediction, and vertical prediction may be generated as follows.

MPM[0]=Intra_Planar

MPM[1]=Intra_DC

MPM[2]=Intra_Vertical          (26)

If the first MPM is a directional mode, the first MPM may be added as an MPM candidate and (N−1) MPM candidates having directions similar to that of the first MPM may be generated (S3490). An MPM having a similar direction to that of the first MPM may have a value calculated by adding or subtracting k to or from the first MPM (k is a natural number equal to or larger than 1). For example, if the first MPM is a directional mode, three MPM candidates, that is, the first MPM, an intra-prediction mode obtained by subtracting 1 from the first MPM, and an intra-prediction mode calculated by adding 1 to the intra-prediction mode of the left neighbor mode may be generated.

MPM[0]=Left_Block_MPM

MPM[1]=Left_Block_MPM−1

MPM[2]=Left_Block_MPM+1

If the first MPM is different from the second MPM, the first MPM and the second MPM may be added as MPM candidates, and (N−2) MPM candidates having predefined intra-prediction modes may be additionally generated (S3495). The number of additionally generated MPM candidates may be 1 or larger. For example, if the first MPM is different from the second MPM, the first MPM and the second MPM may generated as MPM candidates, and an additional MPM candidate set as a planar, DC, or vertical mode may be generated. The additional MPM candidate may not have the same value as the first and second MPMs.

MPM[0]=Left_Block_MPM

MPM[1]=Above_Block_MPM

MPM[2]=Intra_Planar/Intra_DC/Intra_Vertical          (26)

An example of performing inter-prediction for a current block using prediction information of a neighbor block will be described below in detail.

Figure 38:
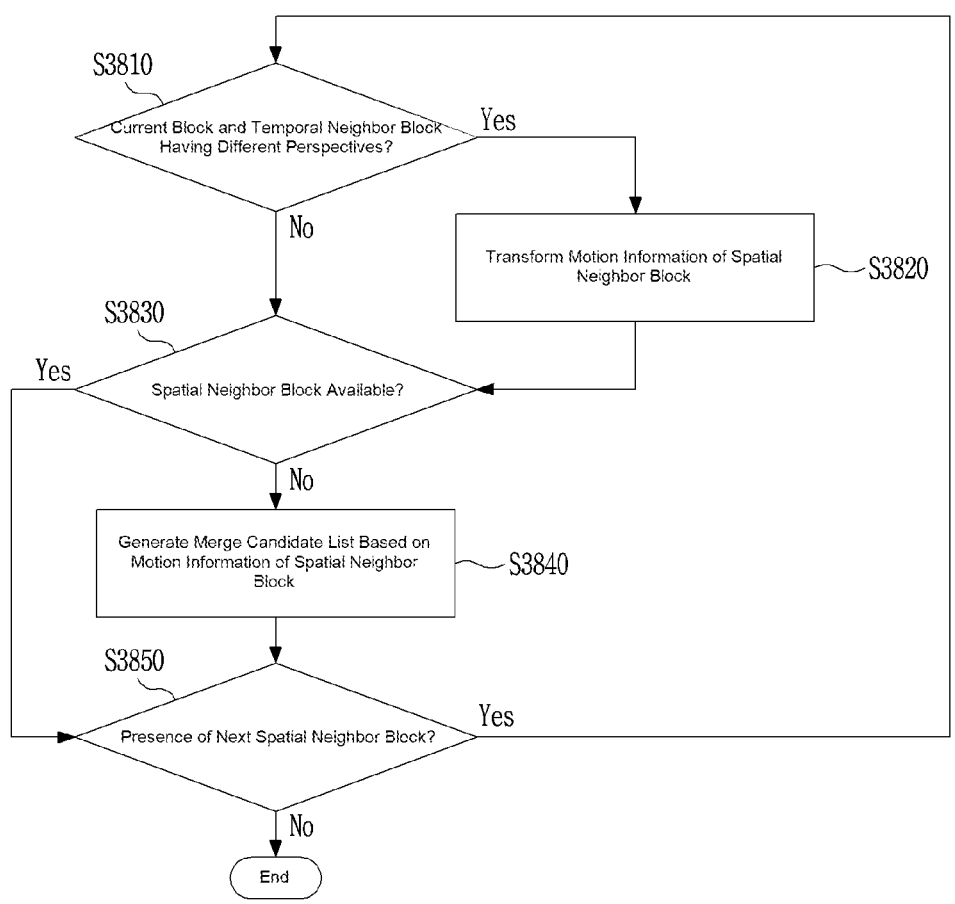
FIG. 38 is a flowchart depicting a procedure for determining a spatial merge candidate for inter-prediction in a merge mode based on prediction information of a neighbor block.

FIG. 38 is a flowchart illustrating a procedure for determining a spatial merge candidate for performing inter-prediction in a merge mode based on prediction information of a neighbor block.

Referring to FIG. 38, it is determined whether a spatial neighbor block of a current block has a different perspective from that of the current block (S3810). If the spatial neighbor block has a perspective different from that of the current block, motion information of the neighbor block is transformed (S3820). The transformed motion information includes a motion vector.

If the current block and the neighbor block are not located at a perspective boundary, the motion information of the neighbor block is not transformed.

Subsequently, the availability of the spatial neighbor block of the current block is determined (S3830). If the spatial neighbor block is available, the motion information or transformed motion information of the spatial neighbor block is included in a merge candidate list (S3840).

The inclusion of motion information or transformed motion information in the merge list in steps S3810 to S3840 may be performed repeatedly for each of a plurality of spatial neighbor blocks of the current block (S3850). For example, as in the example of FIG. 12, if a merge candidate list is generated in the order of A→B→C→D→E, the inclusion of motion information or transformed motion information in the merge candidate list may be performed in the order of a left block A, an upper block B, a right upper block C, a left lower block D, and a lower upper block E.

However, only when at least one of remaining spatial neighbor blocks is not available for inter-prediction, the left upper block may be included in the merge candidate list. Therefore, the inclusion of motion information or transformed motion information in the merge candidate list in steps S3810 to S3840 may be performed only when at least one of remaining spatial neighbor blocks is not available for inter-prediction.

Figure 39:
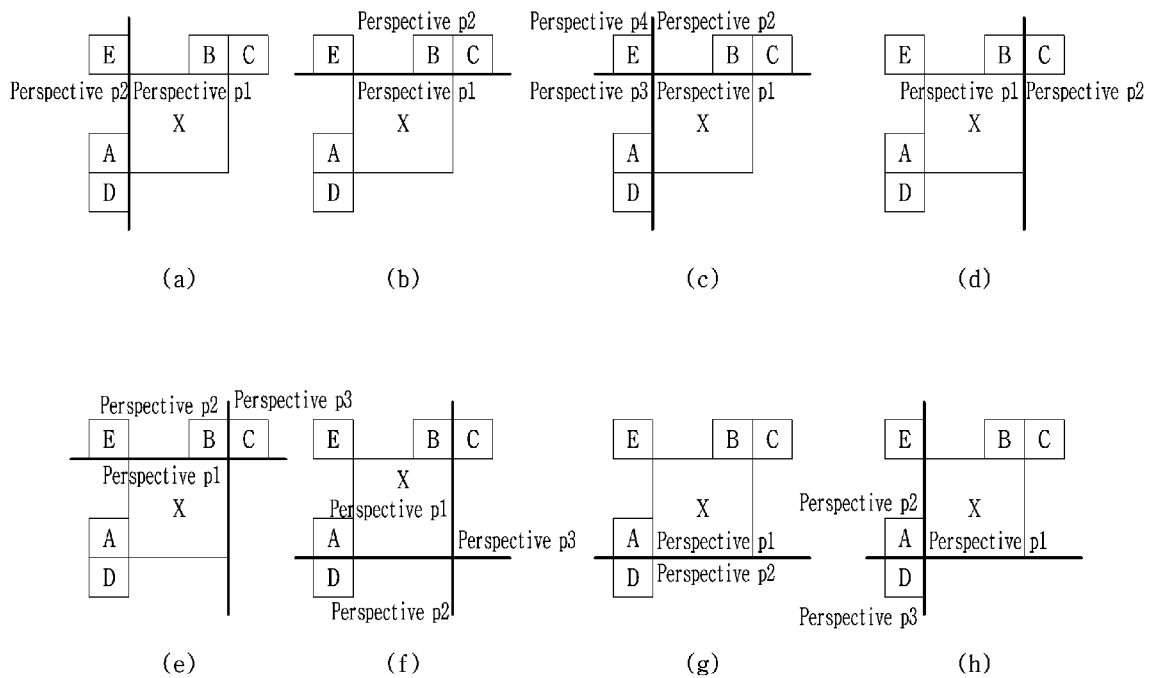
FIG. 39 is a view depicting examples of a current block and a spatial neighbor block which have different views.

FIG. 39 is a view illustrating examples in which a current block has a different perspective from that of a neighbor block.

Referring to (a) of FIG. 39, blocks A, D, and E have different perspectives from that of a current block, and blocks B and C have the same perspective as that of the current block. In this case, motion information of the blocks A, D, and E is transformed based on a perspective difference between perspectives p1 and P2, and motion information of the blocks B and C is not transformed. Then, a spatial merge candidate list may be configured in the order of A, B, C, D, and E using the transformed motion information of the blocks A, D and E, and the motion information of the blocks B and C.

Referring to (b) of FIG. 39, blocks B, C, and E have different perspectives from that of a current block, and blocks A and D have the same perspective as that of the current block. In this case, motion information of the blocks B, C, and E is transformed based on a perspective difference between perspectives p1 and P2, and motion information of the blocks A and D is not transformed. Then, a spatial merge candidate list may be configured in the order of A, B, C, D, and E using the transformed motion information of the blocks B, C and E, and the motion information of the blocks A and D.

Examples in which a current block may have a different perspective from that of a spatial neighbor block are further illustrated in (c) to (h) of FIG. 39. If a current block has a different perspective from that of a spatial neighbor block, motion information of the spatial neighbor block is transformed based on a perspective difference between the current block and the neighbor block, and if the current block has the same perspective as that of the spatial neighbor block, the motion information of the spatial neighbor block is not transformed, as in the above examples.

Figure 40:
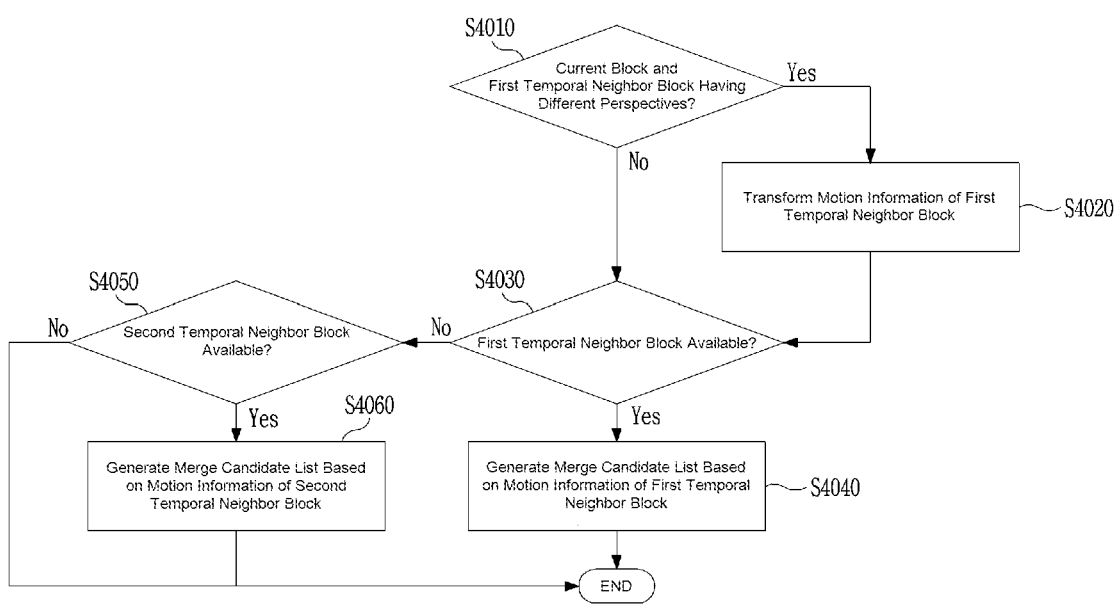
FIG. 40 is a flowchart depicting a procedure for determining a temporal merge candidate for inter-prediction in the merge mode based on prediction information of a neighbor block.

FIG. 40 is a flowchart depicting a procedure for determining a temporal merge candidate for performing inter-prediction in a merge mode based on prediction information of a neighbor block. Herein, the prediction information may include a motion vector of the neighbor block.

A temporal merge candidate may be derived from a temporal neighbor block of a current block. The temporal neighbor block may refer to a collocated block in a collocated picture having a different time order from that of a current picture including the current block. The collocated block may be changed depending on the availability of a first block in the collocated picture. For example, if the first block is available for inter-prediction, the first block may be determined to be a collocated block. If the first block is not available for inter-prediction, a second block at a different position from that of the first block may be determined to be a collocated block. The first block and the second block may be different blocks each being one of a block including the coordinates of a left lower sample of the current block and a block including a center pixel value of the current block.

For the convenience of description, it is assumed that the first block is a block including the coordinates of a left lower sample of the current block, and the second block is a block including a center pixel value of the current block.

Referring to FIG. 40, it is determined whether the first block has a different perspective from that of the current block (S4010). The first block is temporally neighboring to the current block. Thus, if the first block has a different perspective from that of the current block, it may be determined that the first block is located at a perspective boundary with respect to the current block. If the first block has a different perspective from that of the current block, motion information of the first block is transformed (S4020). The transformed motion information includes a motion vector.

On the other hand, if the current block and the first block are not located at a perspective boundary, the motion information of the first block is not transformed.

Subsequently, the availability of the first block is determined (S4030). If motion information of the first block is available as a merge candidate, the motion information of the first block may be added to a merge candidate list (S4040).

On the contrary, if the first block is not available, the availability of the second block is determined (S4050). If motion information of the second block is available as a merge candidate, the motion information of the second block may be added to the merge candidate list (S4060).

The second block includes the center coordinates of the current block and thus has the same perspective as that of the current block. Therefore, the motion information of the second block may be added without transformation to the merge candidate list.

Figure 41:
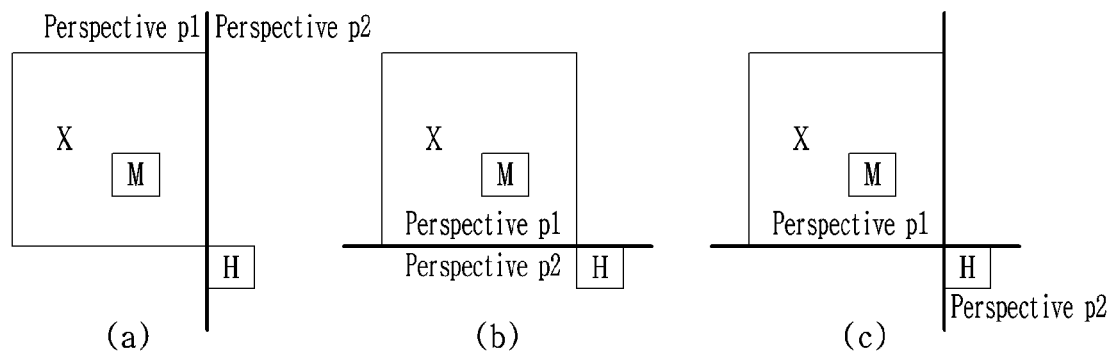
FIG. 41 is a view depicting examples of a current block and a temporal neighbor block which have different views.

FIG. 41 is a view depicting examples in which a current block and a temporal neighbor block have different perspectives.

In the example of FIG. 41, for a current block X, a first block corresponds to a block H and a second block corresponds to a block M. Referring to (a), (b), and (c) of FIG. 41, the current block has a perspective P1, whereas the block H has a perspective P2. In this case, motion information of the block H may be transformed based on a perspective difference between the perspectives P1 and P2.

The block M always has the same perspective as the current block, and thus motion information of the block M may not be transformed.

In FIGS. 38 to 41, it is assumed that the inter-prediction mode of a current block is a merge mode. Besides, when the inter-prediction mode of the current block is an Advanced Motion Vector Predictor (AMVP) mode, the method for transforming prediction information described with reference to FIGS. 38 to 41 is also applicable. For example, if a current block has a different perspective from that of a spatial or temporal neighbor block of the current block, a motion vector of the neighbor block may be transformed and then the transformed motion vector may be added to a Motion Vector Predictor (MVP) candidate list. If the current block has the same perspective as that of the spatial or temporal neighbor block, the motion vector of the neighbor block may be included in the MVP candidate list, without transformation.

According to the present invention, information indicating whether to transform and encode prediction information may be encoded to a coding parameter and signaled in a bit stream. For example, the information indicating whether to transform prediction information may be encoded to a 1-bit flag and signaled. If the flag indicates that prediction information will be transformed, prediction information of a neighbor image may be transformed depending on whether a current block has a different perspective from that of the neighbor block.

The information indicating whether prediction information will be transformed may be signaled in a parameter set, on a picture basis, on a slice basis, or a coding unit basis. [Table 3] illustrates an example of signaling information indicating whether prediction information will be transformed by VPS, [Table 4] illustrates an example of signaling information indicating whether prediction information will be transformed by SPS, and [Table 5] illustrates an example of signaling information indicating whether prediction information will be transformed, on a PU basis.

TABLE 3

| |
| --- |
| video_parameter_set_rbsp( ) { |
| vps_video_parameter_set_id |
| vps_reserved_three_2bits |
| vps_max_layers_minus1 |
| ... |
| perspective_intra_pred_transform_enabled_flag |
| perspective_inter_pred_transform_enabled_flag |
| ... |

TABLE 4

| |
| --- |
| seq_parameter_set_rbsp( ) { |
| sps_video_parameter_set_id |
| sps_max_sub_layers_minus1 |
| sps_temporal_id_nesting_flag |
| ... |
| perspective_intra_pred_transform_enabled_flag |
| perspective_inter_pred_transform_enabled_flag |
| ... |

TABLE 5

| prediction_unit( x0, y0, nPbW, nPbH ) { | Descriptor |
| --- | --- |
| if( cu_skip_flag[ x0 ][ y0 ] ) { if( MaxNumMergeCand > 1 ) merge_idx[ x0 ][ y0 ] | ae(v) |
| ... | |
| perspective_pred_transform_flag | u(1) |
| ... | |

In [Table 3] and [Table 4], 'perspective_intra_pred_transform_enabled_flag' indicates, when an intra-prediction mode is applied, whether prediction information will be transformed, and 'perspective_inter_pred_transform_enable_flag' indicates, when an inter-prediction mode is applied, whether prediction information will be transformed.

If 'perspective_intra_pred_transform_enabled_flag' is '1', this implies that when an intra-prediction mode is applied, prediction information will be transformed. If 'perspective_intra_pred_transform_enabled_flag' is '0', this implies that when an intra-prediction mode is applied, prediction information will not be transformed. Or information indicating whether prediction information will be transformed, when an intra-prediction mode is applied, may be set to the opposite values to the above values.

If 'perspective_inter_pred_transform_enable_flag' is '1', this implies that when an inter-prediction mode is applied, prediction information will be transformed. If 'perspective_inter_pred_transform_enable_flag' is '0', this implies that when an inter-prediction mode is applied, prediction information will not be transformed. Or information indicating whether prediction information will be transformed, when an inter-prediction mode is applied, may be set to the opposite values to the above values.

In [Table 5], 'perspective_pred_transform_flag' indicates whether prediction information will be transformed, irrespective of a prediction mode of a PU.

For example, if 'perspective_pred_transform_flag' is '1', this implies that when an intra-prediction mode or an inter-prediction mode is applied, prediction information will be transformed, and if 'perspective_pred_transform_flag' is '0', this implies that when an intra-prediction mode or an inter-prediction mode is applied, prediction information will not be transformed. Or information indicating whether prediction information will be transformed may be set to the opposite values to the above values.

The configurations of an encoder and a decoder according to the present invention will be described in detail with reference to FIGS. 42 and 43.

Figure 42:
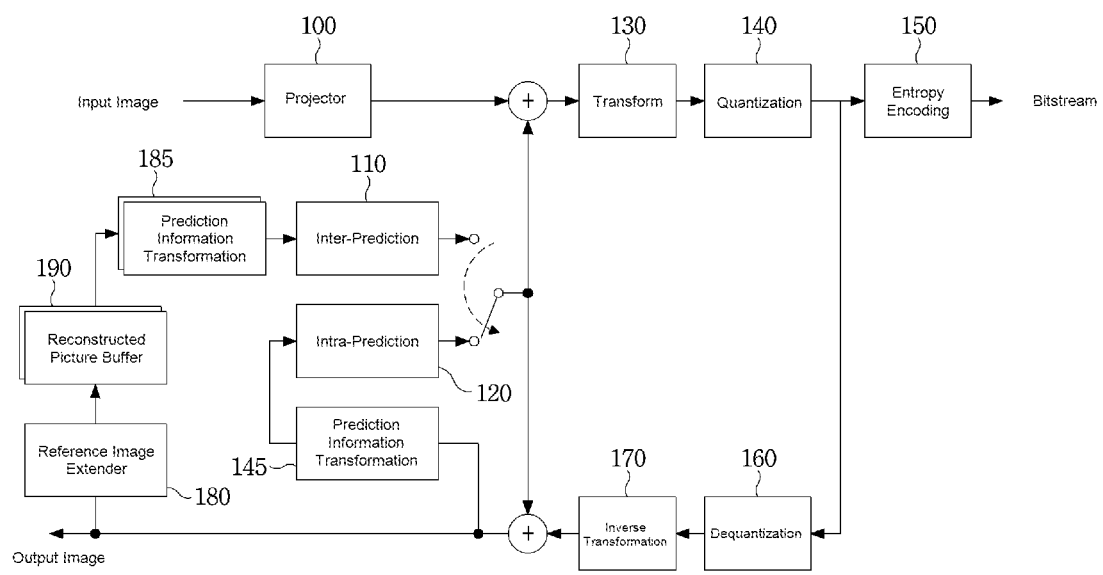
FIG. 42 is a block diagram of an encoder according to the present invention.

FIG. 42 is a block diagram of an encoder according to the present invention.

The encoder is a device that encodes a 3D multiview image such as a planar form of an omni-directional image, a convergent camera image, and a divergent image. The encoder may include a projector 100, an inter-predictor 110, an intra-predictor 120, a transformer 130, a quantizer 140, an entropy encoder 150, a dequantizer 160, an inverse transformer 170, a reference image extender 180, a prediction information transformer 185, and a reconstructed picture buffer 190.

The encoder may encode an input image in an intra-prediction mode (or spatial mode) and/or an inter-prediction mode (or temporal mode). Further, the encoder may generate a bit stream by encoding the input image and output the generated bit stream. If an intra-prediction mode is used as a prediction mode, a switch may switch to intra-prediction, and if an inter-prediction mode is used as the prediction mode, the switch may switch to inter-prediction. The intra-prediction mode may refer to a spatial prediction mode, and the inter-prediction mode may refer to a temporal prediction mode.

The encoder may generate a prediction signal for an input block of the input image. A blockwise prediction signal may be referred to as a prediction block. Further, after generating the prediction block, the encoder may encode a residual between the input block and the prediction block. The input image may be referred to as a current image to be encoded. The input block may be referred to as a current block to be encoded or a target coding block.

The projector 100 projects a 3D multiview image into a 2D form such as an equirectangular form or a planar form of a polyhedron. Thus, a plurality of images having irregular angles and positions may be converted into a 2D image corresponding to the planar form of the polyhedron. The projector may convert a 3D multiview image into a 2D image using the positions and angles of cameras.

If the prediction mode is an intra mode, the intra-predictor 120 may use pixel values of an already encoded block adjacent to the current block as reference pixels. The intra-predictor 120 may perform spatial prediction using the reference pixels, and generate prediction samples for the input block through the spatial prediction.

The intra-prediction mode of the current block may be determined based on the intra-prediction mode of a neighbor block adjacent to the current block. If the current block and the neighbor block have different perspectives, the prediction information transformer 185 may transform the intra-prediction mode of the neighbor block, and determine the intra-prediction mode of the current block based on the transformed intra-prediction mode.

If the prediction mode is an inter mode, the inter-predictor 110 may search for an area most matching to the input block in a reference image during motion prediction, and derive a motion vector using the detected area. The reference image may be stored in the reference picture buffer 190.

If the neighbor block from which to derive the motion vector has a different perspective from that of the current block, the prediction information transformer 185 may transform the motion vector of the neighbor block. A motion vector of the current block may be derived based on the transformed motion vector of the neighbor block.

A subtractor may generate a residual block using the difference between the input block and the prediction block. The residual block may also be referred to as a residual signal.

The transformer 130 may generate transform coefficients by transforming the residual block, and output the transform coefficients. The transform coefficients may be generated by transforming the residual block. If a transform skip mode is applied, the transformer 130 may skip transformation of the residual block.

Quantized transform coefficient levels may be generated by quantizing the transform coefficients. Hereinbelow, the quantized transform coefficient levels may also be referred to as transform coefficients in embodiments.

The quantizer 140 may generate quantized transform coefficient levels by quantizing the transform coefficients according to a quantization parameter, and output the quantized transform coefficient levels. The quantizer 140 may quantize the transform coefficients using a quantization matrix.

The entropy encoder 150 may generate a bit stream by entropy-encoding the values calculated by the quantizer 140 or coding parameter values calculated during encoding according to a probability distribution. The entropy encoder 150 may entropy-encode information required for video decoding in addition to information of pixels of an image. For example, the information required for video decoding may include a syntax element.

If the encoder performs encoding by inter-prediction, a current encoded image may be used as a reference image for a subsequent processed other image(s). Therefore, the encoder may decode the current encoded image and store the decoded image as a reference image. For decoding, the current encoded image may be dequantized and inverse-transformed.

The dequantizer 160 may dequantize the quantized coefficients, and the inverse transformer 170 may inverse-transform the dequantized coefficients. The adder 175 may add the dequantized and inverse-transformed coefficients to the prediction block. As a residual block produced from the dequantization and inverse-transformation is added to the prediction block, a reconstructed block may be generated.

While not shown, the reconstructed block may pass through a filter unit. The filter unit may apply at least one of a deblocking filter, a Sample Adaptive offset (SAO), and an Adaptive Loop Filter (ALF) to the reconstructed block or reconstructed image. The filter unit may be referred to as an in-loop filter.

The reference image extender 180 functions to generate reference images according to the perspective of each image included in a reconstructed omni-directional image, divergent image, or convergent image. The reference images generated through the reference image extender 180 may be grouped on a time basis or on a perspective basis and stored in the reference picture buffer 190. The reference image extender will be described in greater detail with reference to FIG. 44.

Figure 43:
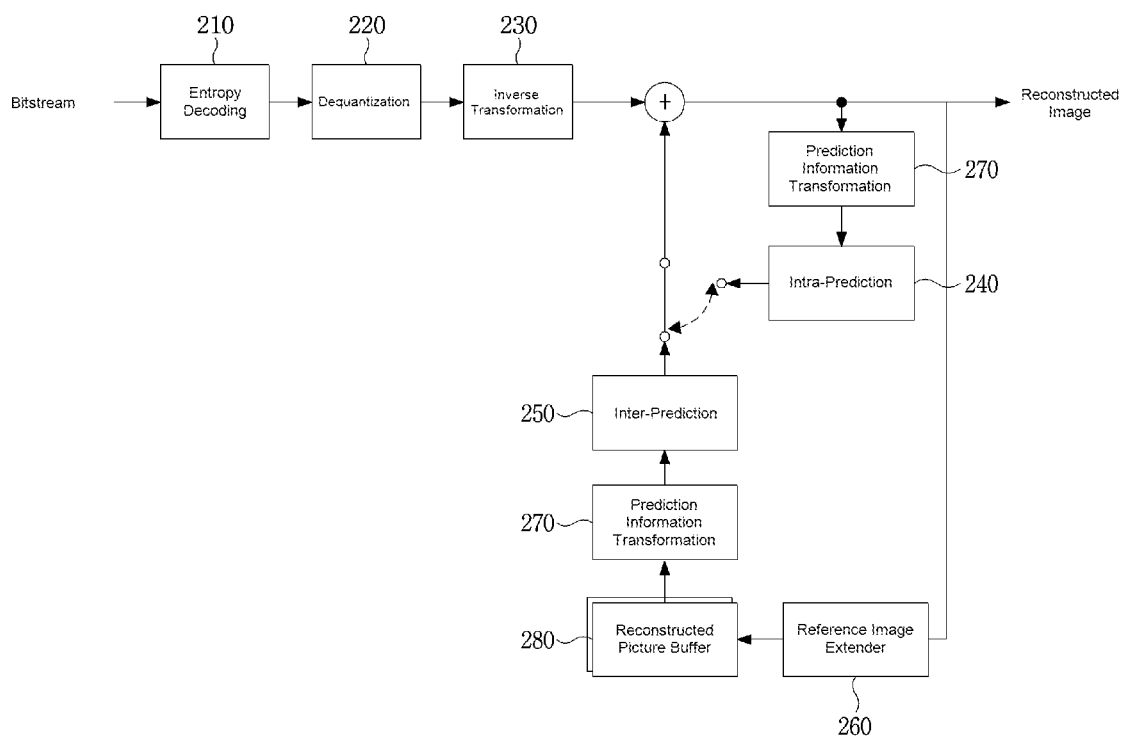
FIG. 43 is a block diagram of a decoder according to the present invention.

FIG. 43 is a block diagram of a decoder according to the present invention.

Referring to FIG. 43, the decoder may include an entropy decoder 210, a dequantizer 220, an inverse transformer 230, an intra-predictor 240, an inter-predictor 250, a reference image extender 260, a prediction information transformer 270, and a reference picture buffer 280.

The decoder may receive a bit stream from an encoder. The decoder may decode the bit stream in an intra mode or an inter mode. Further, the decoder may generate a reconstructed image through decoding and output the reconstructed image.

If the prediction mode for decoding is the intra mode, a switch may switch to intra-prediction, and if the prediction mode for decoding is the inter mode, a switch may switch to inter-prediction.

The decoder may acquire a reconstructed residual block from the input bit stream, and generate a prediction block. Once the reconstructed residual block and the prediction block are acquired, the decoder may generate a reconstructed block to be decoded by adding the reconstructed residual block to the prediction block. The target block to be decoded may be referred to as a current block.

The entropy decoder 210 may generate symbols by entropy-decoding the bit stream according to a probability distribution. The generated symbols may include symbols in the form of quantized transform coefficient levels, and information required for decoding of image data. Entropy decoding may be performed in a similar manner to entropy encoding. For example, the entropy decoding may be a reverse process of the entropy encoding.

The entropy decoder 210 may convert a one-dimensional vector of coefficients to a 2D block by transform coefficient scanning in order to decode the transform coefficient levels. For example, the vector of transform coefficients may be converted into a 2D block by scanning the coefficients of a block through upright scanning Instead of the upright scanning, vertical scanning or horizontal scanning may be used according to the size of a transform unit and an intra-prediction mode. That is, which one of upright scanning, vertical scanning, and horizontal scanning to be used may be determined according to the size of a transform unit and an intra-prediction mode.

The dequantizer 220 may dequantize the quantized transform coefficient levels, and the inverse-transformer 230 may inverse-transform a frequency domain to a spatial domain. A reconstructed residual block may be generated as a result from the dequantization and inverse-transformation of the quantized transform coefficient levels. Herein, the dequantizer 220 may apply a quantization matrix to the quantized transform coefficient levels.

If the intra mode is used, the intra-predictor 240 may generate a prediction block by performing spatial prediction using pixel values of an already decoded block adjacent to the target block to be decoded, in the spatial domain.

The intra-prediction mode of the current block may be derived from an intra-prediction mode of a neighbor block adjacent to the current block. If the current block and the neighbor block have different perspectives, the prediction information transformer 180 may transform the intra-prediction mode of the neighbor block and derive the intra-prediction mode of the current block from the transformed intra-prediction mode.

If an inter mode is used, the inter-predictor 250 may generate a prediction block by performing motion compensation using a motion vector and a reference image stored in the reference picture buffer 280 in the spatial domain. If the motion vector is not an integer value, the inter-predictor 250 may generate a prediction block by applying an interpolation filter to a partial area of the reference image. For the motion compensation, a motion compensation method for a prediction unit included in a corresponding coding unit may be determined from among skip mode, merge mode, AMVP mode, and current picture reference mode, and motion compensation may be performed according to each mode. The current picture reference mode may refer to a prediction mode using an already reconstructed area of a current picture to which the target block to be decoded belongs. The already reconstructed area may be an area that is not adjacent to the target block to be decoded. To specify the already reconstructed area, a flag or index indicating whether the target block to be decoded is a block encoded in the current picture reference mode may be signaled, or may be derived from a reference image index of the target block to be decoded. The current picture for the current picture reference mode may exist at a fixed position (e.g., a position with refIdx=0 or at the last position) in a reference picture list for the target block to be decoded. Or the current picture may reside at a variable position in the reference picture list. For this purpose, an additional reference image index indicating the position of the current picture may be signaled.

In the merge mode or AMVP mode, the motion vector of the current block may be derived based on the motion vectors of spatial or temporal neighbor blocks of the current block. If the current block and a neighbor block from which a motion vector is to be derived have different perspectives, the prediction information transformer 270 may transform the motion vector of the neighbor block. The motion vector of the current block may be derived based on the transformed motion vector of the neighbor block.

An adder may add the reconstructed residual block to the prediction block. While not shown, a block obtained by adding the residual block to the prediction block may pass through a filter unit. The filter unit may apply at least one of a deblocking filter, an SAO, and an ALF to the reconstructed block or reconstructed image.

The reference image extender 260 functions to generate reference images according to the perspective of each image included in a reconstructed omni-directional image, divergent image, or convergent image. The reference images generated through the reference image extender 260 may be grouped on a time basis or on a perspective basis and stored in the reference picture buffer 270. The reference image extender will be described in greater detail with reference to FIG. 44.

Figure 44:
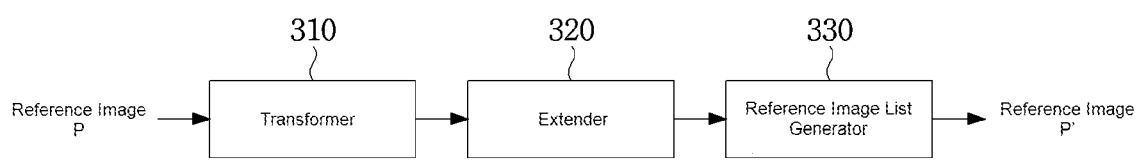
FIG. 44 is a block diagram of a reference image extender according to the present invention.

FIG. 44 is a block diagram of a reference image extender according to the present invention.

Referring to FIG. 44, the reference image extender may include a transformer 310, an extender 320, and a reference image list generator 330.

The transformer 310 determines whether there is any image having a different perspective, which is along the same time axis as an image to be used for prediction and continuous in position to the image to be used for prediction. In the presence of such an image, the transformer 310 transforms the image according to the perspective of the image to be used for prediction. For example, for a 2D image in a planar form of a regular hexahedron, the transformer functions to transform the other images according to the perspective of at least one image among spatially neighboring images having different perspectives.

The extender 320 combines the image to be used for prediction with the image transformed by the transformer 310. That is, the extender may increase the size of the image to be used for prediction (i.e., a reference image) by the size of the added transformed image. The position of the transformed image, for extension, may be determined according to the characteristics or position of the image.

The reference image list generator 330 adds a reference image generated by adding the transformed image to the image to be used for prediction to a reference picture list. The reference image may be input to the reference picture list according to a time axis.

The components described above in the embodiments of the present invention may be achieved by at least one of a programmable logic element such as a Digital Signal Processor (DSP), a processor, a controller, an Application Specific Integrated Circuit (ASIC), or a Field Programmable Gate Array (FPGA), another electronic device, and a combination of them. At least one function or process described above in the embodiments of the present invention may be implemented in software, and the software may be written to a recording medium. Examples of the recording medium include magnetic media such as a hard disk, a floppy disk, and a magnetic tape, optical media such as a CD ROM and a DVD, magneto-optical media such as a floptical disk, and hardware devices specially configured to store and perform a program command, such as a ROM, a RAM, and a flash memory. The program command includes a premium language code executable in a computer by means of an interpreter as well as a mechanical code as written by a compiler. The hardware device may be configured to operate as one or more software modules to perform a process according to the present invention. The components, functions, an processes described in the embodiments of the present invention can be implemented in a combination of hardware and software.

While the present invention has been described above and illustrated by specific details such as components, restricted embodiments, and drawings, the description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

Therefore, the scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used in video encoding/decoding.

The invention claimed is:

1. A video encoding method comprising:
in response to receiving a second image having a different view from a first image having a first view, transforming the second image to have the first view;
generating a reference image by adding the transformed second image to the first image; and
storing the reference image in a reference picture list.

2. The video encoding method according to claim 1, wherein the transformed second image is generated based on a view difference between the first image and the second image, and
wherein the view difference includes at least one of a distance difference and an angle difference between the first image and the second image.

3. The video encoding method according to claim 2, wherein the view difference is determined based on characteristics of an omni-directional image including the first image and the second image.

4. The video encoding method according to claim 3, wherein if the omni-directional image is projected into a regular polyhedron, the angle difference between the first image and the second image is determined to be an internal angle of the regular polyhedron.

5. The video encoding method according to claim 2, wherein the view difference is calculated based on a distance difference and an angle difference between a first camera used to capture the first image and a second camera used to capture the second image.

6. The video encoding method according to claim 1, wherein a position at which the transformed second image is added to is determined according to characteristics of a regular polyhedron including the first image and the second image.

7. The video encoding method according to claim 1, wherein the reference image is stored in the reference picture list along with time information corresponding to the first image and the second image.

8. A video decoding method comprising:
in the presence of a second image having a different view from a first image having a first view, transforming the second image to have the first view;
generating a reference image by adding the transformed second image to the first image; and
storing the reference image in a reference picture list.

9. The video decoding method according to claim 8, wherein the transformed second image is generated based on a view difference between the first image and the second image, and
wherein the view difference includes at least one of a distance difference and an angle difference between the first image and the second image.

10. The video decoding method according to claim 9, wherein the view difference is determined based on characteristics of an omni-directional image including the first image and the second image.

11. The video decoding method according to claim 10, wherein when the omni-directional image is projected into a regular polyhedron, the angle difference between the first image and the second image is determined to be an internal angle of the regular polyhedron.

12. The video decoding method according to claim 10, wherein the view difference is calculated based on a distance difference and an angle difference between a first camera used to capture the first image and a second camera used to capture the second image.

13. The video decoding method according to claim 8, wherein a position at which the transformed second image is added to is determined according to characteristics of a regular polyhedron including the first image and the second image.

14. The video decoding method according to claim 8, wherein the reference image is stored in the reference picture list along with time information corresponding to the first image and the second image.

15. The video decoding method according to claim 14, further comprising:
    selecting at least one reference image from the reference picture list, based on a reference picture index specifying a reference picture for a current block; and
    performing inter-prediction for the current block based on the selected reference picture,
    wherein the reference picture list includes time information corresponding to the reference image of the current block.

16. A video encoding apparatus comprising:
    a transformer for, in the presence of a second image having a different view from a first image having a first view, transforming the second image to have the first view;
    an extender for generating a reference image by adding the transformed second image to the first image; and
    a reference image list generator for storing the reference image in a reference picture list.

17. A video decoding apparatus comprising:
    a transformer for, when there is a second image having a different view from a first image having a first view, transforming the second image to have the first view;
    an extender for generating a reference image by adding the transformed second image to the first image; and
    a reference image list generator for storing the reference image in a reference picture list.

* * * * *